(12) United States Patent
Kakutani

(10) Patent No.: US 7,196,821 B2
(45) Date of Patent: Mar. 27, 2007

(54) IMAGE PROCESSING DEVICE, PRINTING CONTROL DEVICE, IMAGE PROCESSING METHOD, AND RECORDED MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 921 days.

(21) Appl. No.: 10/149,174

(22) PCT Filed: Oct. 5, 2001

(86) PCT No.: PCT/JP01/08837

§ 371 (c)(1),
(2), (4) Date: Jun. 4, 2002

(87) PCT Pub. No.: WO02/32110

PCT Pub. Date: Apr. 18, 2002

(65) Prior Publication Data

US 2002/0181003 A1    Dec. 5, 2002

(30) Foreign Application Priority Data

Oct. 6, 2000 (JP) ............................. 2000-307926
Oct. 3, 2001 (JP) ............................. 2001-307214

(51) Int. Cl.
*G06K 15/00* (2006.01)
*H04N 1/40* (2006.01)
*H04N 1/405* (2006.01)

(52) U.S. Cl. .................. 358/3.03; 358/3.01; 358/3.04; 358/3.05; 382/252

(58) Field of Classification Search ............... 358/3.01, 358/3.03, 3.04, 3.05; 382/232, 234, 237, 382/251, 252
See application file for complete search history.

(56) References Cited

U.S. PATENT DOCUMENTS 4,733,230 A    3/1988    Kurihara et al.

(Continued)

FOREIGN PATENT DOCUMENTS

EP    0 606 988 A2    7/1994

(Continued)

OTHER PUBLICATIONS

Abstract of Korean Patent Publication 1002648040000, Pub. Date: Jun. 5, 2000, Korean Patent Abstracts.

(Continued)

*Primary Examiner*—Thomas D. Lee
(74) *Attorney, Agent, or Firm*—Martine Penilla & Gencarella, LLP

(57) ABSTRACT

When image data is converted into an expression format based on the dot on-off state, such conversion is performed in a unit of a raster group comprising a predetermined number of adjacent rasters. When this is done, the binarization errors occurring in each pixel of the last raster located in the last position of such raster group are diffused into surrounding pixels and stored in a first storage unit. The errors are read out from the first storage unit for dot on-off state determination regarding the first raster of the raster group adjacent to the above-mentioned last raster, and binarization errors occurring in connection with this determination are stored in a second storage unit that permits faster reading and writing of data than the first storage unit. The remaining rasters following the first raster are converted into dot rows by conducting dot on-off state determination for each pixel therein in parallel with the process to convert the first raster into a dot row while taking into account the binarization errors that occurred in the first raster. Consequently, the errors that are taken into account by the pixels of the same raster are stored in the second storage unit that permits faster high-speed reading and writing of data, and the image data for the raster group can be converted at a high speed.

23 Claims, 15 Drawing Sheets

U.S. PATENT DOCUMENTS

| | | | |
|---|---|---|---|
| 5,271,070 A | | 12/1993 | Truong |
| 5,519,791 A | * | 5/1996 | Webb et al. ................. 382/252 |
| 5,553,165 A | * | 9/1996 | Webb et al. ................. 382/252 |
| 5,892,851 A | * | 4/1999 | Nguyen ....................... 382/252 |
| 5,974,228 A | | 10/1999 | Heitsch |
| 6,307,978 B1 | * | 10/2001 | Metaxas ...................... 382/252 |

FOREIGN PATENT DOCUMENTS

| | | |
|---|---|---|
| EP | 0 625 844 A1 | 11/1994 |
| EP | 0 880 275 A2 | 11/1998 |
| EP | 1 005 221 A2 | 5/2000 |
| JP | 6-266324 | 9/1994 |
| JP | 6-332417 | 12/1994 |
| JP | 10-93819 | 4/1998 |
| JP | 10-224627 | 8/1998 |
| JP | 2000-125122 | 4/2000 |
| KR | 10-0264804 | 6/2000 |

OTHER PUBLICATIONS

Panagiotis T. Metaxas, "Optimal Parallel Error-Diffusion Dithering," Proceedings of the SPIE, Conference on Colour Imaging: Device-Independent Color, Color Hardcopy, and Graphic Arts IV, vol. 3648, Jan. 26-29, 1999, pp. 485-494, XP008027794, San Jose, California, USA.

Yuefeng Zhang, "Line Diffusion: A Parallel Error Diffusion Algorithm for Digital Halftoning," Visual Computer, vol. 12, No. 1, 1996, pp. 40-46, XP008027773.

* cited by examiner

Fig.6(a)

|  | K01 1/4 |
|---|---|
| K1-1 1/4 | K10 1/4 | K11 1/4 |

Fig.6(b)

|  |  | K01 1/8 | K02 1/8 |
|---|---|---|---|
| K1-2 1/8 | K1-1 1/8 | K10 1/4 | K11 1/8 | K12 1/8 |

Fig.6(c)

|  |  |  |  | K01 1/8 | K02 1/16 | K03 1/32 | K04 1/32 |
|---|---|---|---|---|---|---|---|
| K1-4 1/32 | K1-3 1/32 | K1-2 1/16 | K1-1 1/8 | K10 1/4 | K11 1/8 | K12 1/16 | K13 1/32 | K14 1/32 |

Fig.6(d)

|  |  | K01 1/4 | K02 1/16 |
|---|---|---|---|
| K1-2 1/16 | K1-1 1/8 | K10 1/4 | K11 1/8 | K12 1/16 |
| K2-2 1/32 | K2-1 1/32 | K20 1/16 | K21 1/32 | K22 1/32 |

Fig.6(e)

|  | K01 7/16 |
|---|---|
| K1-1 3/16 | K10 5/16 | K11 1/16 |

Fig.6(f)

|  |  | K01 4/16 | K02 2/16 |
|---|---|---|---|
| K1-2 1/16 | K1-1 2/16 | K10 5/16 | K11 1/16 | K12 1/16 |

Fig.12(a)

|  |  |  |  | K01 1/8 | K02 1/16 | K 3 1/16 | K 4 1/16 |
| --- | --- | --- | --- | --- | --- | --- | --- |
| K1-4 1/32 | K1-3 1/32 | K1-2 1/16 | K1-1 1/8 | K10 1/4 | K11 1/8 | K12 1/16 |  |

Fig.12(b)

|  |  |  | K01 1/8 | K02 1/16 | K03 1/16 | K04 1/16 |
| --- | --- | --- | --- | --- | --- | --- |
|  | K1-2 1/16 | K1-1 1/8 | K10 1/4 | K11 1/8 | K12 1/16 |  |
| K2-4 1/32 | K2-3 1/32 |  |  |  |  |  |

Fig.12(c)

|  |  |  |  |  |  | K-13 1/16 | K-14 1/16 |
| --- | --- | --- | --- | --- | --- | --- | --- |
|  |  |  |  | K01 1/8 | K02 1/16 |  |  |
| K1-4 1/32 | K1-3 1/32 | K1-2 1/16 | K1-1 1/8 | K10 1/4 | K11 1/8 | K12 1/16 |  |

Fig.12(d)

|  |  |  |  | K01 1/8 | K02 1/16 | K 3 1/16 | K 4 1/16 |
| --- | --- | --- | --- | --- | --- | --- | --- |
| K -4 1/16 | K -3 1/16 | K1-2 1/32 | K1-1 1/16 | K10 1/8 | K11 1/16 | K12 1/32 |  |
|  |  | K2-2 1/32 | K2-1 1/16 | K20 1/8 | K21 1/16 | K22 1/32 |  |

Fig.14(a)

| K-1-1 1/4 | K-10 1/4 | K-11 1/4 |
|---|---|---|
| K0-1 1/4 | ///// | |

Fig.14(b)

| K-1-2 1/8 | K-1-1 1/8 | K-10 1/4 | K-11 1/8 | K-12 1/8 |
|---|---|---|---|---|
| K0-2 1/8 | K0-1 1/8 | ///// | | |

Fig.14(c)

| K-1-4 1/32 | K-1-3 1/32 | K-1-2 1/16 | K-1-1 1/8 | K-10 1/4 | K-11 1/8 | K-12 1/16 | K-13 1/32 | K-14 1/32 |
|---|---|---|---|---|---|---|---|---|
| K0-4 1/32 | K0-3 1/32 | K0-2 1/16 | K0-1 1/8 | ///// | | | | |

Fig.14(d)

| K-2-2 1/32 | K-2-1 1/32 | K-20 1/16 | K-21 1/32 | K-22 1/32 |
|---|---|---|---|---|
| K-1-2 1/16 | K-1-1 1/8 | K-10 1/4 | K-11 1/8 | K-12 1/16 |
| K0-2 1/16 | K0-1 1/8 | ///// | | |

IMAGE PROCESSING DEVICE, PRINTING CONTROL DEVICE, IMAGE PROCESSING METHOD, AND RECORDED MEDIUM

TECHNICAL FIELD

This invention relates to a technology for converting image data that is expressed in terms of tone values for multiple pixels included in an image, and more particularly, to a technology for converting this image data to image data using a specific expression format that is based on the dot on-off state of each pixel.

BACKGROUND ART

Image display apparatuses that express images through the formation of dots on a display medium such as a printing medium or a liquid crystal display are widely used as output devices for various types of image equipment. These image display apparatuses can only express images locally in terms of whether or not a dot is formed, but by appropriately controlling the density of dot formation in accordance with the tone values of the image, images in which the tone changes gradually can be expressed.

In these types of image display apparatuses, the methods by which to determine the dot on-off state for each pixel in order to form dots with the appropriate density in accordance with the image tone values include the method termed the error diffusion method and the method termed the average error minimum method, which is mathematically equivalent to the error diffusion method.

In the error diffusion method, the binarization error occurring due to the formation or non-formation of a dot in a target pixel is diffused among the state-undetermined pixels in the vicinity of the target pixel and stored, and during determination of the dot on-off state for these state-undetermined pixels. the dot on-off state is determined such that the errors diffused from the nearby pixels are eliminated. In the average error minimum method, the binarization error occurring during dot on-off state determination is stored in connection with the target pixel without diffusing it among nearby pixels, and instead, during dot on-off state determination for the state-undetermined pixels, the errors stored in regard to the nearby pixels are read out and the dot on-off state is determined for the target pixel so as to eliminate these errors.

In both of these methods, because the image comprises a large number of pixels, it is impossible to conduct the dot on-off state determination simultaneously for all pixels. At the same time, because the image data is generated through scanning of the original image, the image data is supplied in the order of the pixel rows ('rasters') obtained from scanning. For these reasons, the dot on-off state determination is conducted in the order of the rasters included in the image. Namely, the dot on-off state determination is conducted in sequence beginning at one end of each raster, and when the determination for all pixels in the raster is completed, processing for the next adjacent raster is begun. In these methods, because a pixel belonging to a different raster is not processed consecutively even where it is adjacent to the processed pixel in the image, binarization errors arising from dot on-off state determination are stored in an error buffer, and are subsequently read out and used where necessary. Consequently, by conducting the dot on-off state determination so as to eliminate errors while taking into account the binarization errors arising in nearby pixels, dots can be formed at an appropriate density in accordance with the image tone values, thereby enabling a high-quality image to be displayed on the image display apparatus.

However, in these methods, the problem exists that binarization errors arising each time a dot on-off state determination is conducted must be written to the buffer frequently, which means that the dot on-off state determination cannot be carried out quickly. Namely, in the error diffusion method, an error to be diffused among nearby pixels must be written to the error buffer each time dot on-off state determination is conducted, and in the average error minimum method, binarization errors that occur in nearby pixels must be read out from the error buffer each time dot on-off determination is carried out. In either case, dot on-off state determination is time-consuming to the extent that reading and writing to and from the buffer must be carried out frequently. Where dot on-off state determination takes a long time, it becomes difficult to display image rapidly.

This invention was created in order to resolve the problem with the conventional art described above, and an object thereof is to provide a technology that allows a high-quality image to be displayed rapidly by reducing the amount of time required for dot on-off state determination without causing a deterioration in image quality.

DISCLOSURE OF THE INVENTION

At least part of the above and other related objects is attained by the first image processing apparatus that converts image data into a specific expression format based on the dot on-off state by receiving image data representing tone values for each pixel and determining the dot on-off state for each pixel along a raster which is a row of such pixels, said image processing apparatus comprising:

a raster grouping module that generates a raster group by grouping multiple adjacent rasters;

a last raster conversion module that selects the last raster at the end of said raster group, and by conducting dot on-off state determination for each pixel included in this last raster, converts the last raster into a dot row that indicates the dot on-off state;

a first error diffusion module that calculates the binarization error arising in each pixel included in the last raster due to said dot on-off state determination and diffuses the error among multiple state-undetermined pixels in the vicinity of each such pixel;

a first raster conversion module that selects the first raster located in the top position among the rasters in the raster group adjacent to the last raster and, by determining the dot on-off state for each pixel included in the first raster while taking into account the binarization errors diffused from the last raster among the pixels in this first raster, converts the first raster into a dot row that indicates the dot on-off state;

a second error diffusion module that diffuses the binarization error occurring in each pixel included in the first raster among the state-undetermined pixels in the vicinity of each such pixel; and a remaining raster conversion module that converts the remaining raster other than the first raster of the raster group into a dot row in parallel with the conversion of the first raster into a dot row by determining the dot on-off state for each pixel in the remaining raster while taking into account the binarization errors that were diffused from the pixels that belong to the same raster group as the remaining raster and previously underwent dot on-off state determination, and wherein said first error diffusion module and said second error diffusion module are modules that store in a first error storage unit the errors that are diffused into pixels belonging to a raster group different from that containing the pixels as to which said dot on-off state determination has been conducted, and store in a second error storage unit the errors that are diffused into pixels belonging to the same raster group as the pixels as to which said dot on-off state determination has been conducted.

There is an image processing method corresponding to the above first image processing apparatus. The present invention is accordingly directed to the first image processing method for converting image data into a specific expression format based on the dot on-off state by receiving image data representing tone values for each pixel and determining the dot on-off state for each pixel along a raster which is a row of such pixels, said image processing method comprising the steps of:

(A) generating a raster group by grouping multiple adjacent rasters;

(B) selecting the last raster at the end of the said raster group and determining the dot on-off state for each pixel included in this last raster, thereby converting the last raster into a dot row that indicates the dot on-off state;

(C) calculating the binarization error arising in each pixel due to this dot on-off state determination and diffusing it among multiple state-undetermined pixels in the vicinity of each such pixel;

(D) selecting the first raster located in the top position among the rasters in the raster group adjacent to the last raster, and converting the first raster into a dot row that indicates the dot on-off state by determining the dot on-off state for each pixel included in the first raster while taking into consideration the binarization errors diffused from the last raster among the pixels of said first raster;

(E) diffusing the binarization error occurring in each pixel included in the first raster among the state-undetermined pixels in the vicinity of each such pixel; and (F) converting the remaining raster other than the first raster of the raster group into a dot row in parallel with the conversion of the first raster into a dot row, by determining the dot on-off state for each pixel in the remaining raster while taking into account the binarization errors that were diffused from the pixels that belong to the same raster group as the remaining raster and previously underwent dot on-off state determination, wherein the steps (C) and (E) are steps whereby the errors that are diffused into pixels belonging to the same raster group as the pixels as to which said dot on-off state determination has been conducted are stored separately from the errors that are diffused into pixels belonging to a different group.

In this first image processing apparatus and image processing method, a raster group is defined as a predetermined number of adjacent rasters, and each raster that constitutes a raster group is converted into a dot row through dot on-off state determination for each pixel in that raster. Here, when errors arising through dot on-off state determination are diffused among adjacent state-undetermined pixels, the errors that are diffused among pixels belonging to the same raster group as the state-determined pixels in which a binarization error occurred are stored separately from the errors that are diffused among pixels belonging to a raster group different from the raster group containing these state-determined pixels. The first raster is converted into a dot row through dot on-off state determination carried out while binarization errors diffused from the adjacent raster group and stored are read out. On the other hand, said remaining raster is converted into a dot row in parallel with the conversion of the first raster into a dot row, by determining the dot on-off state for each pixel in the remaining rasters while taking into account the binarization errors that were diffused from the pixels that belong to the same raster group as the remaining raster and previously underwent dot on-off state determination.

If the process of converting the remaining raster into a dot row is performed in parallel with the process of converting the first raster into a dot row, the image data in the raster group can be converted rapidly. Furthermore, because the image data is converted in units of a raster group, errors diffused among pixels belonging to the same raster group are read out earlier than errors diffused among pixels belonging to a different raster group. Therefore, if errors diffused among pixels belonging to the same raster group are stored separately from errors diffused among pixels belonging to a different raster group, errors can be read out more rapidly, which enables the process of image data conversion in units of a raster group to be carried out more rapidly.

In the image processing apparatus described above, it is acceptable if errors diffused among pixels belonging to the same raster group are stored such that at least either storage or read-out thereof can be performed more quickly than it can for errors diffused among pixels belonging to a different raster group.

Where the image data is converted in units of a raster group, binarization errors occurring due to dot on-off state determination are diffused among pixels belonging to the same raster group more often than they are among pixels belonging to a different raster group. Consequently, it is preferred that errors diffused among pixels belonging to the same raster group be stored such that at least either storage or read-out thereof can be performed more quickly than it can for errors diffused among pixels belonging to a different raster group, as this enables error diffusion processing to take place more quickly as a practical matter.

In this image processing apparatus, it is acceptable if the errors that are diffused among pixels belonging to a different raster group and can be simultaneously stored represent a number of pixels that is at least equal to the number of pixels included in the first raster, and if the errors that are diffused among pixels belonging to the same raster group that can be simultaneously stored represent a number of pixels that is smaller than the number of pixels included in the first raster.

Where image data is converted in units of a raster group, because errors diffused among pixels belonging to the same raster group as the first raster are used during conversion of the image data for that raster group and there is no need for them to be stored thereafter, the storage unit in which the errors from the first raster were stored can store errors to be diffused among other pixels belonging to the same raster group. Therefore, it is preferred that the errors that are diffused among pixels belonging to the same raster group and can be stored represent a number of pixels that is smaller than the number of pixels included in the first raster, as this enables the storage unit to be effectively used.

In an image processing apparatus that performs the image data conversion described above using a computer, it is acceptable if errors diffused among pixels belonging to the same raster group are stored in a storage element to and from which the computer's processing unit can directly read or write data, and errors diffused among pixels belonging to a different raster group are stored in a storage element to and from which the computer's processing unit reads or writes data indirectly.

A storage element to and from which the computer's processing unit can directly read or write data can allows high-speed reading and writing, and therefore, storage in such a storage element is preferred because it enables errors diffused among pixels belonging to the same raster group to be stored or read quickly. Moreover, this storage element is not limited to an element that allows only either direct data reading or writing by the processing unit; needless to say, it is also acceptable if it is an element that allows both data reading and writing to be performed by the processing unit directly.

In this image processing apparatus, when binarization errors occurring in each pixel in the last raster are diffused among state-undetermined pixels belonging to a different raster group that surround the pixels as to which the dot on-off state has been determined, it is acceptable if they are diffused only into pixels belonging to the first raster adjacent to the last raster.

In such a case, the binarization errors from the pixels in the different raster group are diffused only among pixels in the first raster, and are not diffused among the pixels in the remaining rasters. As a result, the errors stored in the first error storage unit are read out and the dot on-off state is determined only when the dot on-off state for each pixel in the first raster is determined, and the errors stored in the second error storage unit are read out and the dot on-off state is determined only when the dot on-off state for each pixel in the remaining rasters is determined. This is preferred because it simplifies the processing routine as a whole and enables dot on-off state determination to be performed quickly.

Furthermore, in this image processing apparatus, it is acceptable if the image data is converted into the dot rows in unit of two rasters, and if the first raster located at the front of these two rasters and the last raster located at the end of these two rasters are converted into dot rows as described below. Binarization errors occurring due to dot on-off state determination for each pixel in the last raster are diffused among pixels in the last raster and among pixels in the first raster of the raster group adjacent to such last raster. Binarization errors occurring due to dot on-off state determination for each pixel in the first raster are diffused among pixels in the first raster and among pixels in the last raster following such first raster. And dot on-off state determination is conducted for each pixel in the last raster of each raster group while taking into consideration the binarization errors diffused.

It is preferred that conversion into dot rows be performed two rasters at a time as described above because it enables multiple rasters to be converted into dot rows in parallel through simple processing.

In this image processing apparatus, when binarization errors occurring due to dot on-off state determination are diffused among state-undetermined pixels located a predetermined number of pixels distant from the pixels in which the binarization errors occurred, it is acceptable if such errors are diffused only among pixels of a raster group different from the raster group that has undergone dot on-off state determination.

Where binarization errors occurring due to dot on-off state determination are diffused among distant state-undetermined pixels, there is no significant image quality deterioration even if the errors are diffused into pixels that are slightly off from the true positions. Consequently, where such binarization errors are diffused among distant state-undetermined pixels, it is preferred that the diffusion be concentrated among pixels belonging to a raster group different from the raster group for which the dot on-off state has been determined, because it enables error diffusion processing to be performed in a simple manner.

At least part of the above and other related objects is attained by the second image processing apparatus that converts image data into a specific expression format based on the dot on-off state, by receiving image data representing tone values for each pixel and determining the dot on-off state for each pixel along a raster which is a row of such pixels, said image processing apparatus comprising:

a raster grouping module generates a raster group by grouping multiple adjacent rasters;

a selected raster conversion module selects at least a last raster located at the end of said raster group, and by conducting dot on-off state determination for each pixel included in the selected raster, converts the selected raster into a dot row indicating the dot on-off state;

a first binarization error storage module calculates the binarization error arising in each pixel included in the selected raster due to each dot on-off state determination and stores it in a first storage unit while associating it with each state-determined pixel;

a first raster conversion module selects the first raster located in the top position among the rasters in the raster group adjacent to the last raster, and by determining the dot on-off state for each such pixel included in the first raster while taking into consideration the binarization errors stored in association with the dot state-determined pixels in the vicinity of each pixel included in the first raster, converts the first raster into a dot row;

a second binarization error storage module stores the binarization error occurring in each pixel of the first raster in a second storage unit while associating it with each dot state-determined pixel; and a remaining raster conversion module converts the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

There is an image processing method corresponding to the above second image processing apparatus. The present invention is accordingly directed to the second image processing method for converting image data into a specific expression format based on the dot on-off state, by receiving image data representing tone values for each pixel and determining the dot on-off state for each pixel along a raster which is a row of such pixels, said image processing method comprising the steps of:

(A) generating a raster group by grouping multiple adjacent rasters;

(B) selecting at least a last raster located at the end of said raster group and conducting dot on-off state determination for each pixel included in the selected raster, thereby converting the selected raster into a dot row indicating the dot on-off state;

(C) calculating the binarization error arising in each pixel included in the selected raster due to this dot on-off state determination and storing it in a first storage unit while associating it with each state-determined pixel;

(D) selecting the first raster located in the top position among the rasters in the raster group adjacent to the last raster and converting the first raster into a dot row by determining the dot on-off state for each such pixel while taking into consideration the binarization errors stored in connection with the dot state-determined pixels in the vicinity of each pixel comprising the first raster;

(E) storing the binarization error occurring in each pixel of the first raster in a second storage unit separately from the binarization error stored in the step (C) while associating it with each state-determined pixel; and (F) converting the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

In this second image processing apparatus and second image processing method, as in the first image processing apparatus and first image processing method, each raster is converted into a dot row in units of a raster group comprising a predetermined number of adjacent rasters by conducting dot on-off state determination for each raster included in a raster group. When this is done in connection with the second image processing apparatus and second image processing method, the binarization errors occurring in each pixel of the last raster are stored while being associated with each state-determined pixel, and when dot on-off state determination is carried out for the pixels in the first raster, the binarization errors stored in connection with the last raster pixels in the vicinity of such pixels are read out and their dot on-off state is determined. The binarization errors occurring in each first raster pixel in this way are stored separately from binarization errors occurring in each last raster pixel. The remaining rasters are converted into dot rows in parallel with the conversion of the first raster into a dot row, by determining the dot on-off state for each pixel in the remaining rasters while taking into account the binarization errors that occurred in the pixels that belong to the same raster group as the remaining rasters and previously underwent dot on-off state determination.

If image data is converted into dot rows in units of a raster group and with the first raster and the remaining rasters in parallel as described above, rapid image data conversion is made possible. Furthermore, because image data is converted in units of a raster group, binarization errors occurring in the last raster of the raster group undergoing processing are read out after processing of the current raster group is completed, unlike binarization errors occurring in other rasters of the same group. Therefore, if binarization errors occurring in the last raster of a raster group are stored separately from binarization errors occurring in other rasters in that group, they can be read out quickly, thereby enabling image data conversion to be carried out quickly as well.

In the image processing apparatus described above, it is acceptable if binarization errors occurring in rasters other than the last raster are stored such that either storage or read-out thereof can be performed more quickly than for binarization errors occurring in the last raster.

Where image data is converted in units of a raster group, because a raster group has only one last raster but one or more non-last rasters, when dot on-off state determination is performed, binarization errors occurring in non-last rasters are read out more frequently than binarization errors occurring in the last raster. Therefore, it is preferred that binarization errors occurring in rasters other than the last raster be stored such that either storage or read-out thereof can be performed more quickly than it can for binarization errors occurring in the last raster, as this enables conversion of the image data in units of a raster group to be conducted more quickly as a practical matter.

In this image processing apparatus, it is acceptable if binarization errors that occur in the pixels of the last raster and can be simultaneously stored represent a number of pixels that is at least equal to the number of pixels included in the last raster, and if binarization errors that occur in the pixels belonging to the first raster and that can be simultaneously stored represent a number of pixels that is smaller than the number of pixels included in the first raster.

Where image data is converted in units of a raster group, because errors diffused among pixels belonging to the same raster group are used during conversion of the image data for that raster group and there is no need for them to be stored thereafter, the storage unit in which the errors were stored can store errors to be diffused among other pixels belonging to the same raster group. Therefore, it is preferred that the errors that are diffused among pixels belonging to the same raster group and can be stored represent a number of pixels that is smaller than the number of pixels comprising the first raster, as this enables the storage unit to be effectively used.

In an image processing apparatus that performs the image data conversion described above using a computer, it is acceptable if errors that occurred in each pixel of the first raster are stored in a storage element to and from which the computer's processing unit can directly read or write data, and if errors that occurred in each pixel of the last raster are stored in a storage element to and from which the computer's processing unit reads or writes data indirectly.

A storage element to and from which the computer's processing unit can directly read or write data allows quick reading and writing, and therefore, storage in such a storage element of the binarization errors that occurred in the pixels of the first raster is preferred because it enables the image for the raster group to be converted quickly. Needless to say, it is acceptable if this storage element is an element that allows both direct data reading and writing by the processing unit.

In this second image processing apparatus, it is acceptable if only the binarization errors that occurred in each pixel of the last raster of a raster group are stored in connection with each such pixel and the first raster is converted into a dot row while taking into account the binarization errors for each pixel of the last raster.

In such a case, because binarization errors occurring in last raster pixels belonging to a different raster group are read out only when dot on-off state determination is performed for each pixel in the first raster, and because binarization errors occurring in pixels belonging to a different raster group need not be read out when dot on-off state determination is performed for each pixel in the remaining rasters, the image data in the raster group can be converted quickly.

Furthermore, in this image processing apparatus, it is acceptable if the image data is converted into the dot rows in unit of two rasters, and if the first raster located at the front of these two rasters and the last raster located at the end of these two rasters are converted into dot rows as described below. Only binarization errors occurring in the last raster are stored in the first storage unit, and when dot on-off state determination is conducted for the pixels included in the first raster of the next raster group, the binarization errors stored in connection with each pixel of the last raster are read out to be used for dot on-off state determination, while binarization errors occurring in each pixel of the first raster are stored in the second storage unit. The last raster following the first raster is converted into a dot row in parallel with the conversion of the first raster into a dot row, taking into consideration the binarization errors occurring in each pixel in the first raster.

It is preferred that conversion into dot rows be conducted in unit of two rasters, as described above, as it enables parallel conversion of multiple rasters into dot rows to be carried out through simple processing.

In the first and second image processing apparatuses described above, it is acceptable if, in order to convert the remaining raster into a dot row while taking into account binarization errors occurring in each pixel in the first raster, the remaining raster is converted into a dot row by conducting dot on-off state determination while taking into consideration errors that have been diffused among the pixels of the remaining raster from the first raster, or if the remaining raster is converted into a dot row by conducting dot on-off state determination while taking into consideration binarization errors occurring in each pixel of the first raster.

It is advantageous for either of these methods to be employed, as they both enable a remaining raster to be converted into a dot row while taking into account binarization errors occurring in the pixels of the first raster.

The first or second image processing apparatus described above pertaining to the present invention can be advantageously employed in a printing control apparatus that controls a printing unit that prints images through the formation of ink dots on a printing medium by outputting print data that controls such ink dot formation.

The first or second image processing apparatus described above can receive image data indicating the tone values for each pixel and quickly convert this image data into image data reflecting dot on-off state determination results. Consequently, if the first or second image processing apparatus is applied in the printing control apparatus described above, image data can be quickly converted into print data. It is advantageous for the print data obtained in this manner to be output to the printing unit, as it enables the printing unit to print high-quality images at high speed.

The present invention can be implemented in the form of a program to execute the first or second image processing method described above that is read into a computer and executed thereby. Therefore, the present invention also includes an aspect as the recording medium described below. Namely, the recording medium corresponding to the first image processing method described above is a recording medium on which is recorded a computer-readable program that implements a method to convert image data into a specific expression format based on the dot on-off state by receiving image data indicating tone values for each pixel and determining the dot on-off state for each pixel along a raster which is a row of such pixels, said program causing a computer attain the functions of:

(A) generating a raster group by grouping multiple adjacent rasters;

(B) selecting the last raster at the end of the said raster group and determining the dot on-off state for each pixel included in this last raster, thereby converting the last raster into a dot row that indicates the dot on-off state;

(C) calculating the binarization error arising in each pixel due to this dot on-off state determination and diffusing it among multiple state-undetermined pixels in the vicinity of each such pixel;

(D) selecting the first raster located in the top position among the rasters in the raster group adjacent to the last raster, and converting the first raster into a dot row that indicates the dot on-off state by determining the dot on-off state for each pixel included in the first raster while taking into consideration the binarization errors diffused from the last raster among the pixels of said first raster;

(E) diffusing the binarization error occurring in each pixel included in the first raster among the state-undetermined pixels in the vicinity of each such pixel; and (F) converting the remaining raster other than the first raster of the raster group into a dot row in parallel with the conversion of the first raster into a dot row, by determining the dot on-off state for each pixel in the remaining raster while taking into account the binarization errors that were diffused from the pixels that belong to the same raster group as the remaining raster and previously underwent dot on-off state determination, wherein the steps (C) and (E) are steps whereby the errors that are diffused into pixels belonging to the same raster group as the pixels as to which said dot on-off state determination has been conducted are stored separately from the errors that are diffused into pixels belonging to a different group.

The recording medium corresponding to the second image processing method described above is a recording medium on which is recorded a computer-readable program that implements a method to convert image data into a specific expression format based on the dot on-off state by receiving image data representing tone values for each pixel and determining the dot on-off state for each pixel along a raster comprising a row of such pixels, said program causing a computer attain the functions of:

(A) generating a raster group by grouping multiple adjacent rasters;

(B) selecting at least a last raster located at the end of said raster group and conducting dot on-off state determination for each pixel included in the selected raster, thereby converting the selected raster into a dot row indicating the dot on-off state;

(C) calculating the binarization error arising in each pixel included in the selected raster due to this dot on-off state determination and storing it in a first storage unit while associating it with each state-determined pixel;

(D) selecting the first raster located in the top position among the rasters in the raster group adjacent to the last raster and converting the first raster into a dot row by determining the dot on-off state for each such pixel while taking into consideration the binarization errors stored in connection with the dot state-determined pixels in the vicinity of each pixel comprising the first raster;

(E) storing the binarization error occurring in each pixel of the first raster in a second storage unit separately from the binarization error stored in the step (C) while associating it with each state-determined pixel; and (F) converting the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

If the programs recorded on these recording media are caused to be read by a computer and the various functions described above are implemented using such computer, the image data indicating the tone values for each pixel can be quickly converted into a specific expression format based on the dot on-off state.

BRIEF DESCRIPTION OF THE DRAWINGS

FIG. 6 is an explanatory drawing showing the situation in which an error diffusion coefficient is assigned to each pixel;

FIG. 12 is an explanatory drawing showing a conceptual view of the error diffusion matrix that diffuses errors to be diffused among distant pixels among pixels regarding which error buffers are allocated in a fourth modification of the tone number conversion process of the first embodiment;

FIG. 14 is an explanatory drawing showing the situation in which a weighting coefficient is assigned to each pixel in the tone number conversion routine of a modification of the second embodiment;

BEST MODES OF CARRYING OUT THE INVENTION

Figure 1:
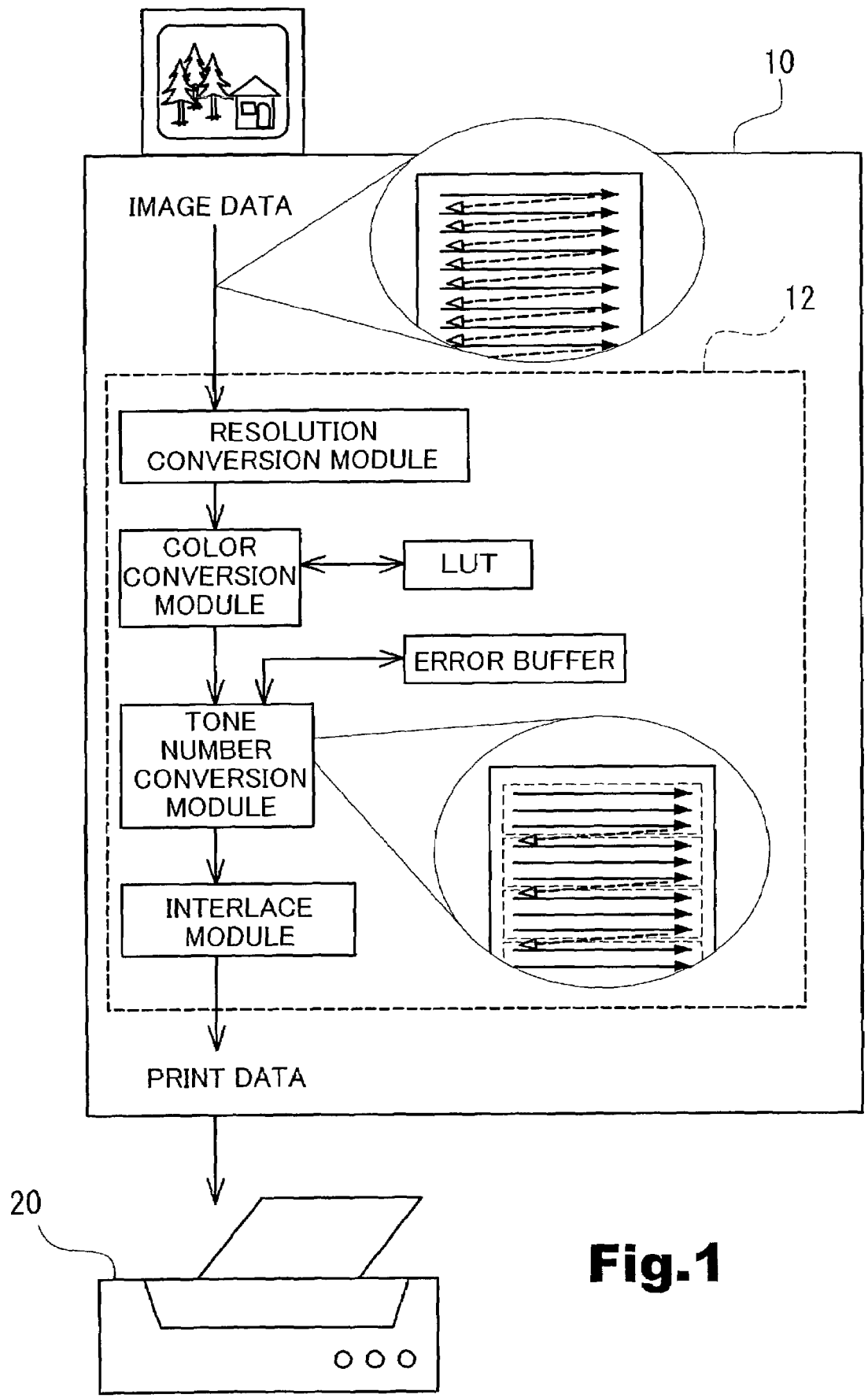
FIG. 1 is a summary construction diagram of the printing system of this embodiment.

In order to provide a clearer description of the operation and effect of the present invention, the embodiments of the present invention are described below based on the following sequence:

A. Mode of Carrying Out Invention
B. First Embodiment:
B-1. Apparatus Construction:
B-2. Summary Description of Image Data Conversion Routine:
B-3. Tone Number Conversion Routine of the First Embodiment:
B-4. Modifications:
C. Second Embodiment:
C-1. Tone Number Conversion Routine of the Second Embodiment:
C-2. Modifications:

A. Mode of Carring Out Inventions:

An embodiment of the present invention will be explained with reference to FIG. 1. FIG. 1 is an explanatory drawing to describe an embodiment of the present invention using an example of a printing system. This printing system comprises a computer 10 that serves as an image processing apparatus and a color printer 20 or the like. When the computer 10 receives tone image data for a color image from imaging equipment such as a digital camera or a color scanner, it converts the image data into print data expressed based on the dot on-off state for each color that can be printed by the color printer 20. This conversion of image data is carried out using a dedicated program termed the printer driver 12. Tone image data for a color image can also be created by the computer 10 using various types of application programs.

The printer driver 12 comprises multiple modules, i.e., a resolution conversion module, a color conversion module, a tone number conversion module, and an interlace module. The tone number conversion module is a module that executes a routine to convert tone image data into a specific format based on the dot on-off state. When the dot on-off state of a target pixel is determined, the tone number conversion module of this embodiment conducts dot on-off state determination of the target pixel such that binarization errors occurring regarding nearby pixels are taken into consideration and are eliminated. The routines executed by the other modules will be described below. The color printer 20 prints color images by forming ink dots of all colors on a printing medium based on the print data converted by the various modules.

The image data supplied to the printer driver 12 has a data construction wherein the tone values of each pixel comprising the original image are output in sequence one raster at a time beginning with the edge of the image, as shown in a conceptual manner in FIG. 1. Based on the data construction of the supplied data, the resolution conversion module and the color conversion module of the printer driver 12 perform processing one raster at a time, but the tone number conversion module in the printing system of the present invention carries out processing of a predetermined number of adjacent rasters in a parallel manner according to methods described below. FIG. 1 shows a conceptual view of the situation in which three rasters are processed in parallel as an example. While the process will be described in more detail below, when multiple rasters are processed in parallel in this manner, because dot on-off state determination can be conducted while taking into account binarization errors occurring in adjacent rasters among such multiple rasters processed in a parallel manner, there is no need to store binarization errors or diffusion errors in an error buffer one by one. Namely, using the tone number conversion module of these embodiments, because it is not necessary to frequently read from or write to the error buffer, dot on-off state determination can be carried out quickly to that extent.

There are various specific methods by which to conduct dot on-off state determination while taking into account binarization errors occurring among multiple rasters, and these methods will be described below in connection with the various embodiments.

Figure 2:
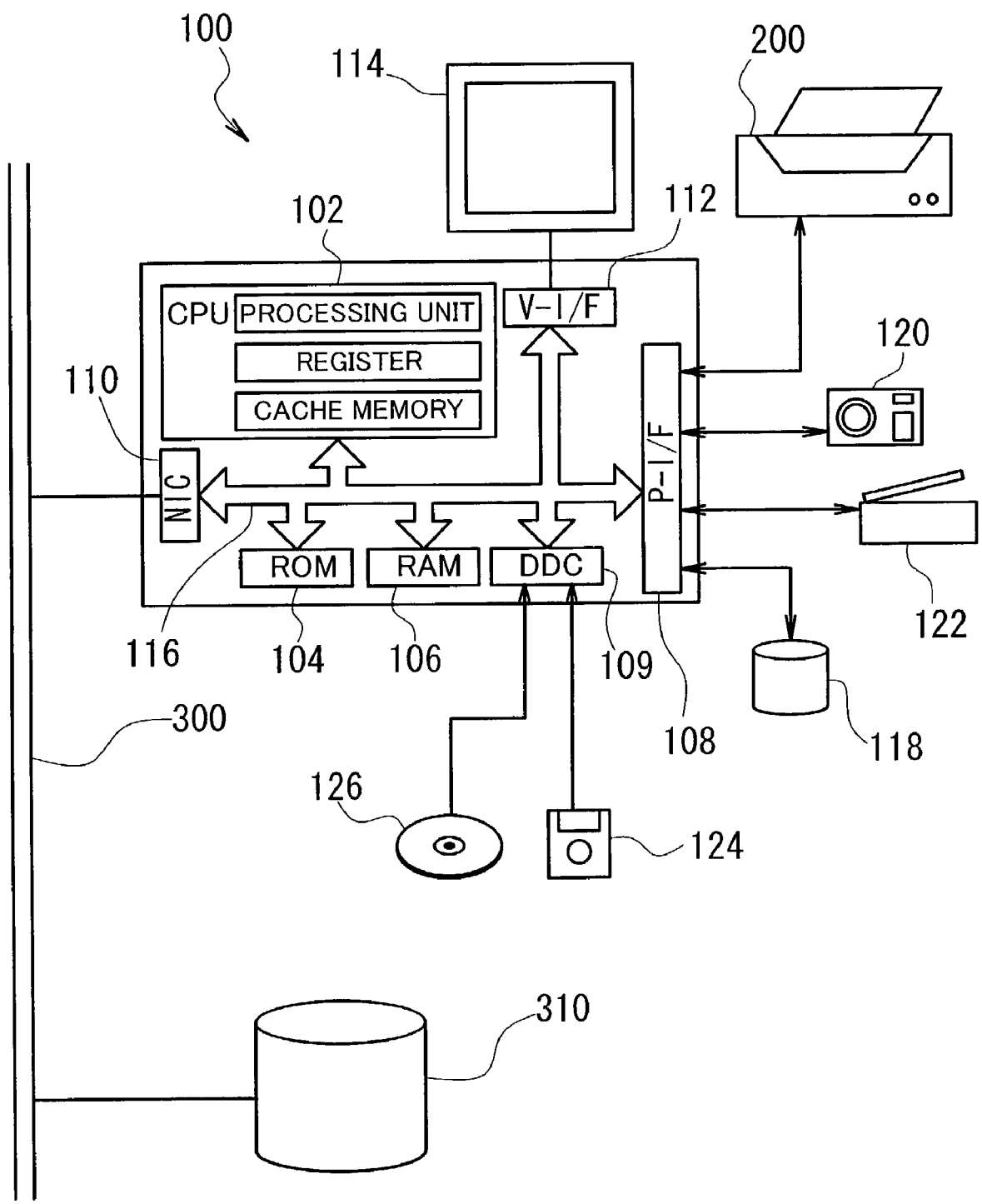
FIG. 2 is an explanatory drawing showing the construction of a computer comprising the image display apparatus of this embodiment.

B. First Embodiment:

B-1. Apparatus Construction:

FIG. 2 is an explanatory drawing showing the construction of a printer 100 comprising the image processing apparatus of the first embodiment. The computer 100 is a conventional computer centered around a CPU 102, wherein a ROM 104 and a RAM 106 are interconnected via a bus 116. The CPU 102 comprises a processing unit that performs actual processing and multiple registers in which data is temporarily stored during processing. The data stored in the registers can be processed much more quickly than the data stored in the RAM 106.

A disk controller DDC 109 used to read data from a floppy disk 124 or a compact disk 126, a peripheral equipment interface P-I/F 108 used to send and receive data to and from peripheral equipment, a video interface V-I/F 112 used to drive a CRT 114 and the like are connected to the computer 100. A color printer 200 described below, a hard disk 118 and the like are connected to the P-I/F 108. Furthermore, if a digital camera 120 or a color scanner 122 or the like is connected to the P-I/F 108, images incorporated via the digital camera 120 or color scanner 122 may be printed. In addition, if a network interface card NIC 110 is mounted, the computer 100 can be connected to a transmission line 300, and data stored in a storage apparatus 310 connected to this transmission line can be obtained.

Figure 3:
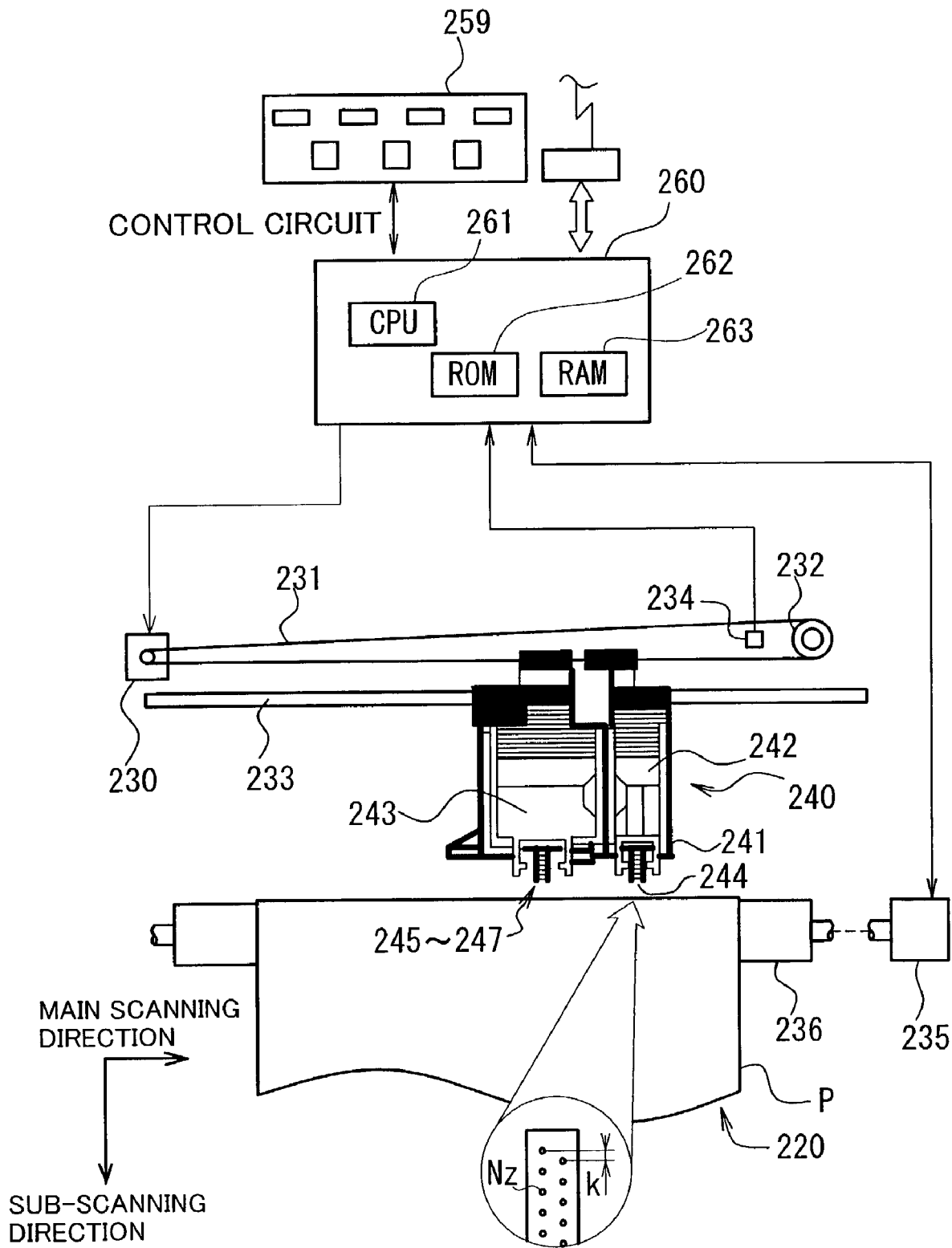
FIG. 3 is a summary construction drawing of a printer comprising the image processing apparatus of this embodiment.

FIG. 3 is an explanatory drawing showing a summary construction of the color printer 200 of the first embodiment. The color printer 200 is an inkjet printer that can form dots from ink in the four colors of cyan, magenta, yellow and black. Naturally, an inkjet printer than can form dots using a total of six colors of ink by including in addition to these four colors cyan having a lower concentration of cyan pigment (light cyan) and magenta having a lower concentration of magenta pigment (light magenta) can also be used. Furthermore, it is also acceptable to use an inkjet printer than can form dots using a total of seven colors of ink by including in addition to these six colors (dark) yellow ink having a lower brightness (dark yellow). Moreover, in the discussion below, cyan ink, magenta ink, yellow ink, black ink, light cyan ink, light magenta ink and dark yellow ink may be abbreviated as C ink, M ink, Y ink, K ink, LC ink, LM ink and DY ink, respectively.

As shown in the drawing, the color printer 200 comprises a mechanism that drives a print head 241 mounted on a carriage 240, ejects ink and forms dots, a mechanism that causes the carriage 240 to move forward and backward along the axis of the platen 236 via a carriage motor 230, a mechanism that conveys the printing paper P via a paper feed motor 235, and a control circuit 260 that control dot formation, the movement of the carriage 240 and the conveyance of the printing paper P.

An ink cartridge 242 that contains K ink and an ink cartridge 243 that contains C ink, M ink and Y ink are mounted to the carriage 240. When the ink cartridges 242 and 243 are mounted to the carriage 240, the inks in each cartridge are supplied via a guide tube not shown in the drawing to the color-specific ink ejection heads 244 through 247 located on the bottom of the print head 241. As shown in the drawing, multiple nozzles Nz are aligned in a zigzag arrangement on the K ink ejection head 244 according to a fixed nozzle pitch (k). The other color-specific ink ejection heads 245 through 247 similarly have a set of nozzle rows comprising nozzles aligned in a zigzag arrangement according to a nozzle pitch (k).

The control circuit 260 comprises a CPU 261, a ROM 262, a RAM 263 and the like, and controls main scanning and sub-scanning of the carriage 240 by controlling the operation of the carriage motor 230 and the paper feed motor 235, as well as ejects ink droplets from each nozzle in accordance with the proper timing based on print data supplied from the computer 100. In this way, the color printer 200 can print color images through the formation of ink dots of various colors at appropriate positions on the printing medium under the control of the control circuit 261.

For the method by which to eject ink droplets from the color-specific ink ejection heads, various methods may be applied. These include the method of ejecting ink using a piezoelectric element and the method of ejecting ink droplets by causing bubbles to form inside the ink channel using a heater located in the ink channel. Alternatively, instead of ejecting ink, a printer may be used that employs a method in which ink dots are formed on the printing medium using a phenomenon such as heat transfer, or a method in which toner particles of various colors are caused to adhere to the printing medium using electrostatic force.

Moreover, it is also possible to use a so-called variable dot printer that can control the size of the ink dots formed on the A printing medium using a method that controls the size of the ink droplets ejected from the ink ejection head or a method that ejects multiple very small ink droplets at one time and controls the number of ink droplets ejected.

Figure 4:
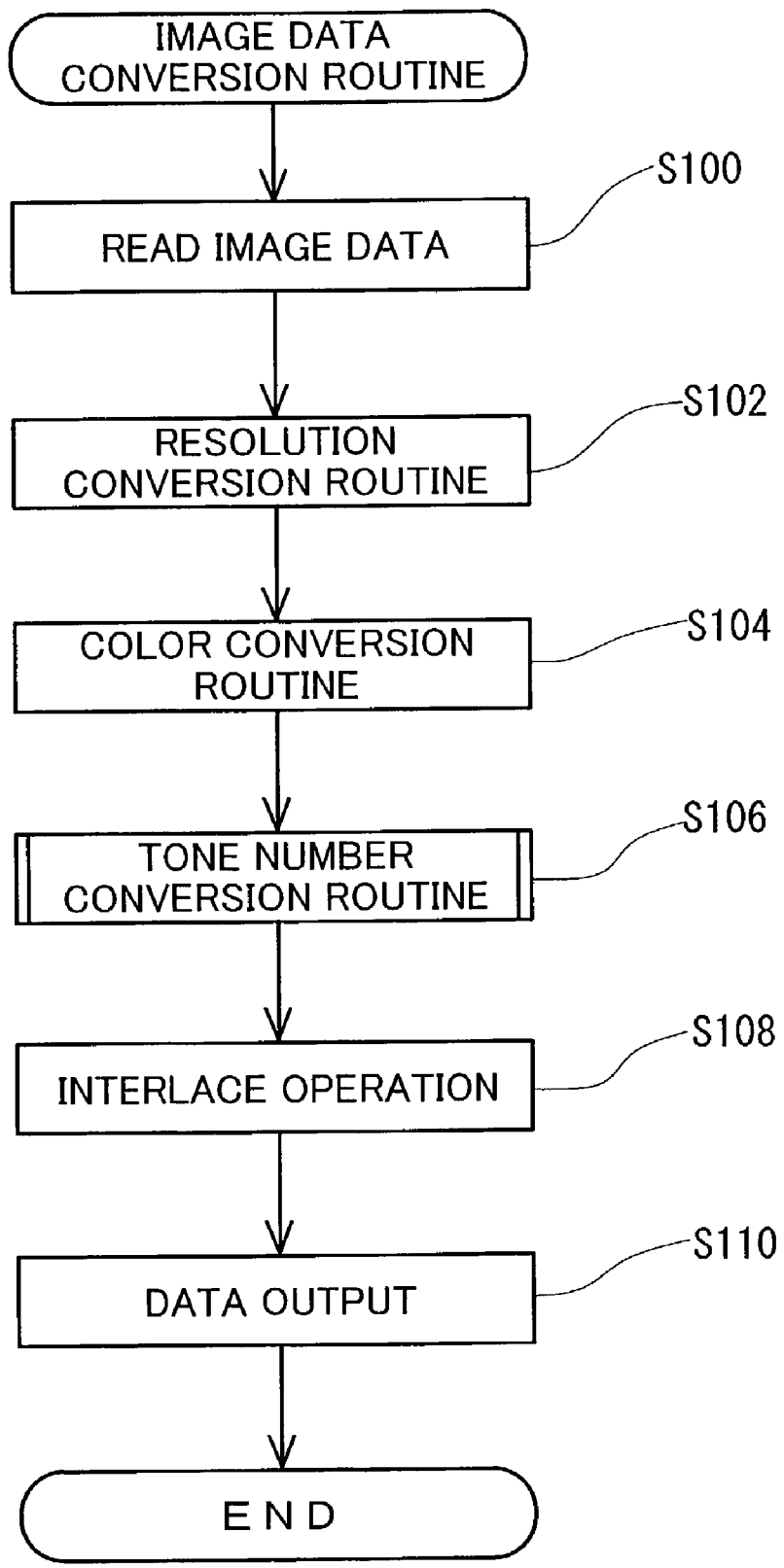
FIG. 4 is a flow chart showing the sequence of the image data conversion routine executed by the image processing apparatus of this embodiment.

B-2. Summary Description of Image Data Conversion Routine:

FIG. 4 is a flow chart showing the sequence of the routine whereby the computer 100, which serves as the image processing apparatus in the first embodiment, converts the image data into print data by subjecting the received image data to prescribed image processing. This routine is begun when the operating system of the computer 100 runs the printer driver 12. A simplified explanation of the image data conversion routine of the first embodiment is provided below with reference to FIG. 4.

When the image data conversion routine is begun, the printer driver 12 first commences the reading of the RGB color image data to be converted (step S100). The image data is read by the printer driver 12 one raster at a time for each of the colors R, G and B.

The resolution of the read-in image data is then converted into a resolution to be used for printing by the color printer 200 (step S102). Where the resolution of the color image data is lower than the print resolution, new data is generated between pixels of the read-in image data by linear interpolation, while where it is higher than the print resolution, the image data is converted into a print resolution through thinning out according to a predetermined ratio.

After the resolution is converted in this manner, the color image data undergoes color conversion processing (step S104). The color conversion routine is a process by which the color image data expressed as a combination of R, G and B tone values is converted into image data expressed as a combination of tone values for each color used by the color printer 200, such as C, M, Y and K. The color conversion routine can be performed quickly by referring to a three-dimensional table called a color conversion table (LUT). The resolution conversion routine (step S102) and color conversion routine (step S104) described above are carried out one raster at a time.

When the color conversion routine is completed, the tone number conversion routine is then begun (step S106). The tone number conversion routine is a process described below. The tone data converted in the color conversion routine is expressed as data having a range of 256 tones for each color. In contrast, in the color printer 200 of this embodiment, only one of the operations 'form dot' or 'do not form dot' can be chosen. Namely, the color printer 200 of this embodiment can express only two tones when the image is seen locally. Accordingly, the image data having 256 tones must be converted into image data expressed in the two tones that can be expressed by the color printer 200. A process in which the number of tones is converted as described above is the tone number conversion routine. As described above, in the tone number conversion routine of this embodiment, high-speed processing is made possible by conducting the dot on-off state determination for multiple rasters in a parallel manner. The tone number conversion routine will be explained in more detail below.

After the tone number conversion routine is completed as described above, the printer driver begins the interlace routine (step S108). The interlace routine is a process in which the image data that has undergone conversion to a specific format based on the dot on-off state is arranged in the order in which it is to be forwarded to the color printer 200 from the standpoint of the order of dot formation. The printer driver 12 outputs to the color printer 200 as print data the image data ultimately obtained after performance of the interlace routine (step S110). The color printer 200 forms ink dots of each color on the printing medium based on the print data. As a result, color images corresponding to the image data are formed on the printing medium.

The process in which dot on-off state determination is quickly performed through parallel processing of multiple rasters in the tone number conversion routine of the first embodiment is explained below.

B-3. Tone Number Conversion Routine of the First Embodiment:

(a) Summary Description of Tone Number Conversion Routine Using Error Diffusion Method:

As preparation for describing the method in which multiple rasters are subjected to dot on-off state determination in a parallel manner and the principle by which the time required for carrying out the tone number conversion routine is shortened by carrying it out in a parallel manner, the method for conducting dot on-off state determination for each raster using the so-called error diffusion method will now be briefly described.

FIG. 5 is an explanatory drawing showing a conceptual enlarged view of part of the image for which dot on-off state determination is to be conducted. Each small individual grid element represents a pixel, and a raster is formed by one horizontal row of these pixels. For convenience, the topmost raster in FIG. 5(*a*) will be termed 'raster 0', the next raster down will be termed 'raster 1', and subsequent rasters will be termed 'raster 2', 'raster 3', and so on. In order to differentiate individual pixels, each pixel will be given the designation 'Pmn', where Pmn represents the nth pixel of the raster (m). The image data that emerges from the color conversion routine shown in FIG. 4 is data regarding which a tone value for each color is associated with each pixel.

The error diffusion method determines the dot on-off state for each pixel in a raster, as described below. FIG. 5(*a*) is an explanatory drawing showing a conceptual view of the situation in which dot on-off state determination is conducted for the pixel P11. In this specification, a pixel for which dot on-off state determination is to be conducted, such as the pixel P11 here, is referred to as a target pixel. In the drawing, a target pixel is a pixel indicated by a boldface line surrounding it, such as the pixel P11. The area in the drawing shaded by hatched lines indicates pixels as to which dot on-off state determination has already been performed.

As shown in FIG. 5(*a*), when dot on-off state determination is conducted for the pixel P11, a binarization error E11 occurs in the pixel P11 as a result. Namely, regardless of whether or not a dot is formed in the pixel P11, the tone value expressed in the pixel P11 (this tone value will hereinafter be termed the result value) will normally not match the tone value of the image data for that pixel. Therefore, a binarization error occurs in the target pixel to the extent of the difference between the result value for the pixel P11 and the tone value of the image data for the pixel P11. The error diffusion method diffuses the binarization error occurring during dot on-off state determination among the state-undetermined pixels surrounding the target pixel according to a predetermined weighting system. The weighting coefficient used when error diffusion is carried out among the surrounding state-undetermined pixels is called the error diffusion coefficient, and is preset for each pixel in the vicinity of the target pixel.

FIG. 6 is an explanatory drawing showing the assignment of error diffusion coefficients. The pixel marked by hatched lines in FIG. 6 is the target pixel, and the error diffusion coefficient for each pixel is assigned in relation to its position relative to the target pixel. Accordingly, the matrix in which the error diffusion coefficients for the pixels surrounding the target pixel are set is termed the error diffusion matrix. For example, in the error diffusion matrix shown in FIG. 6(*a*), '¼' is assigned as the error diffusion coefficient K01 for the pixel adjacent to the target pixel on the right in the drawing. Therefore, using the error diffusion matrix of FIG. 6(*a*), ¼ of the binarization error occurring in the target pixel is allocated to the pixel to the right. Similarly, ¼ of the binarization error occurring in the target pixel is allocated to the pixel just below the target pixel, the pixel below and to the left of the target pixel, and the pixel below and to the right of the target pixel, respectively. The error diffusion matrix is not limited to the matrix shown in FIG. 6; various sizes may be established for the area within which the error is diffused and various values may be used for the error diffusion coefficients, and in the actual error diffusion method, an appropriate error diffusion matrix is used that will enable good image quality to be obtained. In order to avoid making the description unduly complex, in the description below, the matrix that has the smallest area for error diffusion among the error diffusion matrices shown as examples is used for the error diffusion matrix, i.e., the description will use the error diffusion matrix shown in FIG. 6(*a*).

If the matrix shown in FIG. 6(*a*) is used as the error diffusion matrix, the binarization error E11 occurring in the target pixel P11 is distributed among the four pixels of P12 located to the right, P20 located below and to the left, P21 located directly below, and P22 located below and to the right, and ¼ of the binarization error E11 is allocated to each. Among the four surrounding pixels, the pixels P20, P21 and P22 are pixels belonging to the raster 2, unlike the pixel P11. Because the error (diffused error) diffused among the pixels surrounding the target pixel in this manner is used when dot on-off state determination is conducted for each of these pixels, it must be stored in such a way that the allocated error amounts for each pixel are distinguished from each other. Consequently, diffused errors are stored in a high-capacity RAM 106 (see FIG. 2) that can store diffused errors for many pixels.

Figure 5A:
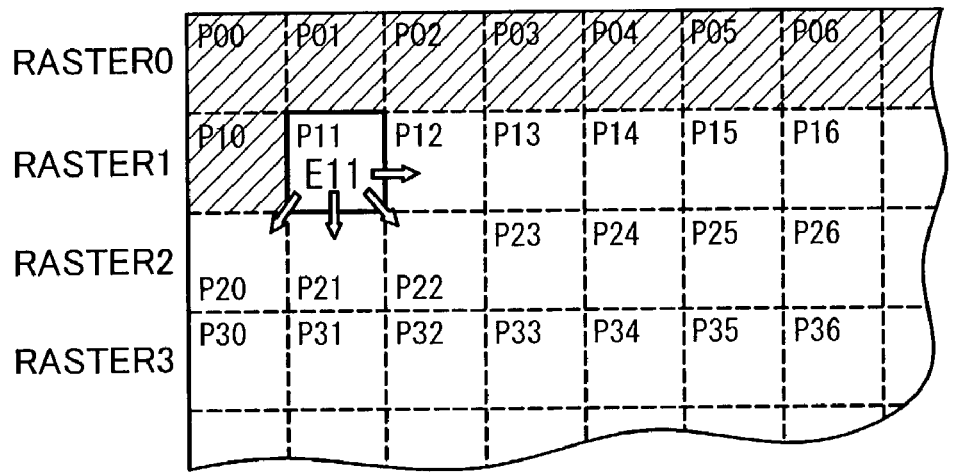
FIG. 5 is an explanatory drawing showing a conceptual view of the situation in which dot on-off state determination is conducted using the error diffusion method.
Figure 5B:
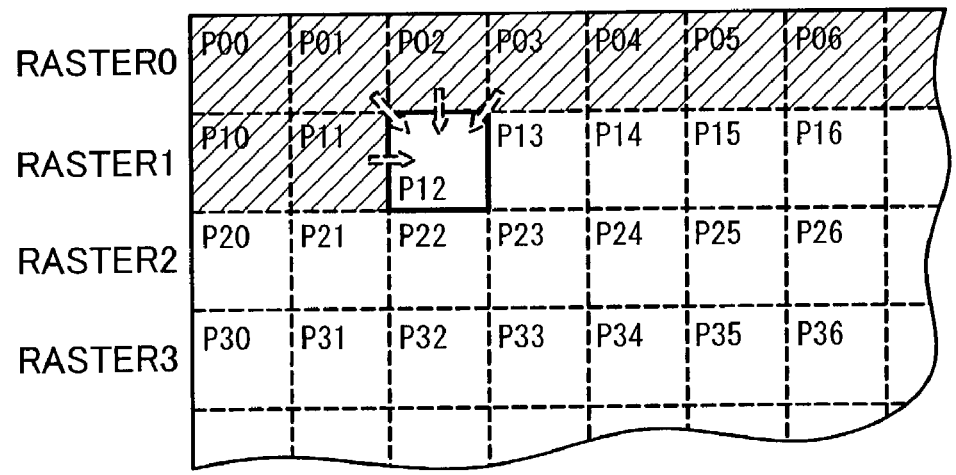
Figure 5C:
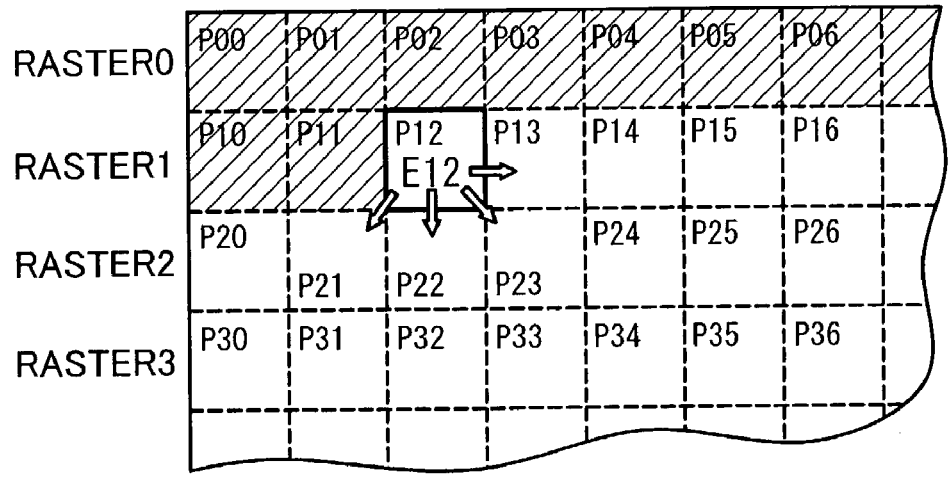

Once the binarization error for the pixel P11 has been diffused among the surrounding pixels, dot on-off state determination is conducted for the pixel P12 located to the right of the former target pixel P11, as shown in FIG. 5(a). FIG. 5(b) is an explanatory drawing showing a conceptual view of the situation in which dot on-off state determination is conducted for the pixel P12. When this dot on-off state determination is conducted, the sum of the diffused error portions allocated to the target pixel P12 from the surrounding pixels and accumulated therein is read out, and the image data for the target pixel P12 is corrected based on the read-out diffused error value. As shown in FIG. 5(b), the errors diffused from the pixels that surround the target pixel based on the error diffusion matrix described above and that previously underwent dot on-off state determination, i.e., the pixels P01, P02, P03 and P11, are stored in connection with the target pixel P12. Dot on-off state determination is conducted by reading out the sum of the diffused error portions from the RAM 106, correcting the image data for the target pixel P12, and comparing the obtained corrected value with a predetermined threshold value. FIG. 5(c) shows the situation after dot on-off state determination is conducted for the new target pixel P12. Because the binarization error E12 occurs in the new target pixel P12 as a result of dot on-off state determination therefor, this binarization error is diffused among the surrounding pixels in accordance with the error diffusion matrix as described above in connection with FIG. 5(a).

Once the binarization error occurring in the pixel P12 has been diffused among the surrounding pixels, dot on-off state determination is conducted for the next pixel to the right, i.e., the pixel P13. Because the binarization error E13 occurs in the new target pixel P13, this error is diffused among the surrounding pixels in accordance with the error diffusion matrix, and dot on-off state determination is carried out once more for the pixel to the right. When the rightmost pixel is reached after the target pixel is moved to the right one pixel at a time while diffusing binarization errors among surrounding pixels as described above, dot on-off state determination is begun for the leftmost pixel of the next raster down (in the example shown in FIG. 5, the pixel P20). As with the raster 1, once the rightmost pixel of the raster 2 of the image is reached, the process begins with the leftmost pixel of the raster 3 of the image once more.

According to the error diffusion method, dot on-off state determination is conducted in this way while moving the target pixel along the raster one pixel at a time and taking into account errors diffused from surrounding pixels. Binarization errors occurring as a result of these determinations are diffused among surrounding state-undetermined pixels and stored, and are used when dot on-off state determination is conducted for these state-undetermined pixels.

Here, surrounding pixels include pixels in a raster that is different from the raster to which the target pixel belongs, as described above. Because dot on-off state determination is conducted along a raster, the allocated diffused error portions must be maintained and stored until processing for the raster to which the pixel belongs begins. Moreover, because a raster includes a large number of pixels, the allocated diffused error portions must be stored on a pixel-by-pixel basis for a large number of pixels while they are distinguished for each pixel. This is the reason that a high storage capacity RAM 106 is required in order to store diffused errors.

In addition, because a binarization error is diffused among surrounding state-undetermined pixels each time dot on-off state determination is conducted for a target pixel, data must be frequently written to and read from the RAM 106. If data is frequently written to and read from the RAM 106, the time required for such reading and writing increases to that extent, which lengthens the period of time required for dot on-off state determination.

(b) Summary Description of Tone Number Conversion Routine of This Invention:

By contrast, in the tone number conversion routine of this embodiment, dot on-off state determination is conducted for multiple rasters in a parallel manner as described below. When this type of processing is performed, because the frequency of reading and writing of data to and from the RAM 106 is reduced, dot on-off state determination can be conducted more quickly. The principle by which dot on-off state determination is conducted quickly by processing multiple rasters in a parallel manner is described below.

FIG. 7 is an explanatory drawing showing the principle by which dot on-off state determination is carried out for two rasters in a parallel manner as the simplest example. Here, dot on-off state determination is conducted in a parallel manner for the raster (i) and the raster (j) immediately therebelow.

Figure 7A:
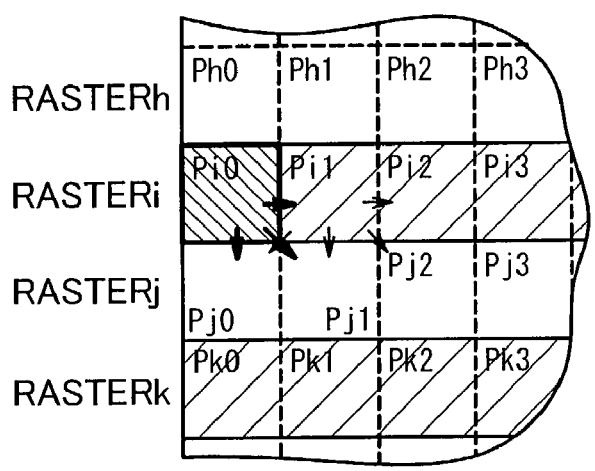
FIG. 7 is an explanatory drawing showing the principle of shortening processing time by performing parallel processing of multiple rasters in the tone number conversion routine of a first embodiment.
Figure 7B:
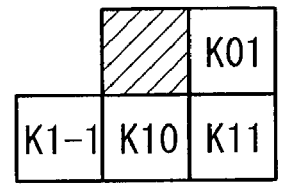
Figure 7C:
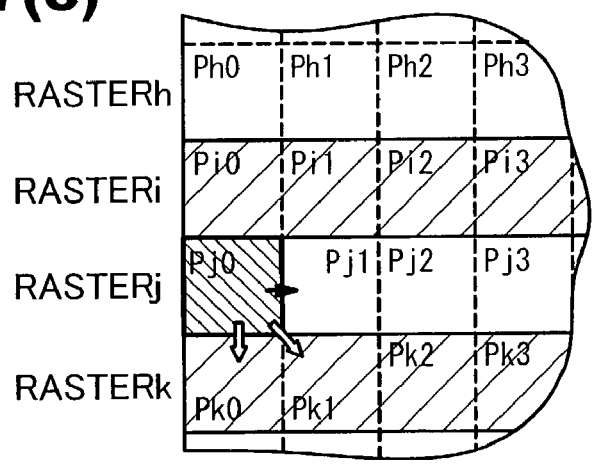

First, dot on-off state determination for the leftmost pixel Pi0 of the raster (i) is conducted. FIG. 7(a) shows a conceptual view of the situation in which the dot on-off state of the pixel Pi0 is conducted. Portions of errors such as those from the pixels Ph0 and Ph1 of the raster (h) located directly above the raster (i) are allocated to and stored in connection with the pixel Pi0. Accordingly, dot on-off state determination for the pixel Pi0 is carried out by reading the sum of the diffusion error portions stored in connection the pixel Pi0 from the RAM 106 of the computer 100, correcting the tone value of the image data for the pixel Pi0, and comparing the obtained corrected value with a predetermined threshold value. Because a binarization error occurs in the pixel Pi0 when dot on-off state determination for the pixel Pi0 is conducted in this manner, the error is diffused among the surrounding pixels in accordance with the error diffusion matrix. Here, in order to avoid making the description unduly complex, the description uses the relatively simple error diffusion matrix shown in FIG. 6(a). For ease of understanding, the same error diffusion matrix shown in FIG. 6(a) is shown in FIG. 7(b) as well. The binarization error occurring in the pixel Pi0 is distributed among the three pixels Pi1, Pj0 and Pj1 based on the error diffusion matrix shown in FIG. 7(b), and the respective diffused error portions are stored in the registers incorporated in the CPU 102. The boldface arrows in FIG. 7(a) show the situation in which the binarization error from the pixel Pi0 is diffused among the surrounding pixels.

In this specification, the diffused errors occurring in the multiple rasters processed in a parallel manner (in FIG. 7, the errors diffused from the pixels in the raster i into the pixels in the raster j, for example) are stored in the registers, and the diffused errors occurring in the multiple rasters not processed in a parallel manner (in FIG. 7, the errors diffused from the pixels in the raster j into the pixels in the raster k, for example) are stored in the RAM 106. As described above, because data can be read and written more quickly to and from the CPU registers than to and from the RAM 106, use of the registers enables the tone number conversion routine to be performed at a higher speed. Naturally, however, errors occurring in the rasters processed in a parallel manner need not always be stored in the registers, and it is acceptable if they are stored in the RAM 106, for example. Even where these diffused errors that are immediately used are stored in the RAM 106, because normally the values remaining in the cache memory of the CPU 102 can be used, high-speed reading and writing can be performed as a practical matter, enabling the tone number conversion routine to be executed quickly.

Once dot on-off state determination for the pixel Pi0 has been conducted and any resulting error has been diffused, the dot on-off state determination for the next pixel to the right, i.e., the pixel Pi1, is begun. With regard to the pixel Pi1 as well, the binarization errors occurring in the pixels of the raster (h) located directly above the pixel Pi1 are diffused therein in accordance with the error diffusion matrix of FIG. 7(*b*) and stored in advance in the RAM 106. Accordingly, the errors diffused from the pixels in the raster (h) and stored in advance in the RAM 106 are read out, and the tone value of the image data for the pixel Pi1 is corrected based on these diffusion errors and the diffusion error portion allocated to the pixel Pi1 from the pixel Pi0 and stored in the registers. When this is done, because the pixel Pi1 image data is corrected using the errors diffused from the pixels Ph0, Ph1 and Ph2, as well as the pixel Pi0, a correction value equivalent to that obtained by the ordinary error diffusion method can be obtained.

If the corrected value is larger than the threshold value after comparison between this corrected value and the predetermined threshold value, it is determined that a dot should be formed in the pixel Pi1, and if not, it is determined that a dot should not be formed. Because a binarization error occurs in the pixel Pi1 as a result of the determination, this error is distributed among the four surrounding pixels of Pi2, Pj0, Pj1 and Pj2 in accordance with the error diffusion matrix. The diffused error values allocated to these four pixels are stored individually for each pixel in the registers of the CPU 102. The arrows indicated by fine lines in FIG. 7(*a*) show the situation in which the binarization error occurring in the pixel Pi1 is diffused among surrounding pixels. Because the diffused error from the pixel Pi0 has already been stored in connection with the pixel Pj0, the diffused error from the pixel Pi1 is added to this value and accumulated therein. When dot on-off state determination has been conducted for the pixel Pi1, because the register used to store the diffused error values for the pixel Pi1 is no longer necessary, this register can be used to store the diffused error value allocated from the pixel Pi1 to another pixel.

Once dot on-off state determination has been conducted for the pixels Pi0 and Pi1 in the raster (i), dot on-off state determination is begun for the leftmost pixel Pj0 in the raster (j). Because binarization errors occurring due to dot on-off state determination are diffused among surrounding pixels in accordance with the error diffusion matrix 7(*b*), once the diffused error from the pixel Pi0 and the diffused error from the pixel Pi1 are allocated, all of the diffused errors that will be allocated to the pixel Pj0 have been allocated. Accordingly, dot on-off state determination is conducted for the pixel Pj0 after it is conducted for these two pixels.

FIG. 7(*c*) is an explanatory drawing showing a conceptual view of the situation in which dot on-off state determination is conducted for the pixel Pj0. According to the error diffusion matrix shown in FIG. 7(*b*), the errors from the pixels Pi0 and Pi1 are diffused into the pixel Pj0, but the values for these errors are stored in the registers of the CPU 102 and not in the RAM 106, as described above. Therefore, using these values, the tone value of the image data for the pixel Pj0 is corrected, and dot on-off state determination is conducted based on the relative sizes of the corrected value and the threshold value. The binarization error occurring in the pixel Pj0 as a result of this determination is diffused among the three surrounding pixels Pj1, Pk0 and Pk1 in accordance with the error diffusion matrix.

Here, in the example shown in FIG. 7, dot on-off state determination is conducted for the pixels of the raster (i) and the pixels of the raster (j) in a parallel manner. As a result, the dot on-off state determination for the two pixels of Pk0 and Pk1 is conducted after dot on-off state determination is completed for all of the pixels of the raster (i) and the raster (j). Accordingly, because it is assumed that the values for the errors diffused into the pixels Pk0 and Pk1 will not be used for the time being, these values are stored in the RAM 106. On the other hand, because it is assumed that the errors diffused into the pixel Pj1 are going to be used in the near future, they are stored in the registers of the CPU 102. Because dot on-off state determination is conducted for the rasters (i) and (j) in a parallel manner as described above, the errors that occur in the raster above the raster (i) and are diffused into the pixels of the raster (i) are stored in the RAM 106. Similarly the errors that occur in the raster (j) and are diffused into the pixels of the raster (k) are also stored in the RAM 106. Conversely, the errors that occur in the raster (i) and are diffused into the pixels of the raster (j) are stored in the registers of the CPU 102. In FIG. 7, the hatched lines in the rasters (i) and (k) indicate that the errors diffused into the pixels of these rasters are stored in the RAM 106.

Furthermore, the arrow pointing from the pixel Pj0 to the pixel Pk0, and the arrow pointing from the pixel Pj0 to the pixel Pk1 are white in the center of the arrow shaft in FIG. 7(*c*), indicating that the diffused error portions allocated to these pixels are stored in the RAM 106. Conversely, the fact that the arrow pointing from the pixel Pj0 to the pixel Pj1 is boldfaced indicates that the diffused error portion allocated to the pixel Pj1 is stored in the registers of the CPU 102. Because dot on-off state determination has already been conducted for the pixel Pj0, the register in which the diffused error portions allocated to the pixel Pj0 were stored can be used for another purpose, such as for storing the diffused error portions for the pixel Pj1.

Once the binarization error occurring in the pixel Pj0 has been diffused among surrounding pixels as described above, dot on-off state determination for the pixel Pi2 in the raster (i) is then conducted, the binarization error that occurs is diffused among surrounding pixels, and dot on-off state determination is then conducted for the pixel Pj1 in the raster (j). FIG. 7(*d*) is an explanatory drawing showing a conceptual view of this situation. When dot on-off state determination is conducted for the pixel Pi2, the image data tone value is corrected based on the errors diffused from the pixels of the raster (h) and stored in the RAM 106, as well as on the error that was diffused from the pixel Pi1 and stored in a register of the CPU 102, and dot on-off state determination is conducted. The binarization error occurring due to this determination is diffused among the surrounding pixels. As shown by the boldfaced arrow in FIG. 7(*d*), the error portions allocated to the surrounding pixels are stored in registers. When dot on-off state determination is conducted for the following pixel Pj1, the image data tone value is corrected using the diffused errors stored in the register for the pixel Pj1, and dot on-off state determination is conducted based on the relative sizes of the corrected value and the predetermined threshold value. The portions of the binarization error occurring due to dot on-off state determination and diffused into the pixels of the raster (k) are stored in the RAM 106, and the error portions allocated to the pixels of the raster (j) are stored in the registers. Once processing is completed for the pixels Pi2 and Pj1 in this manner, processing is performed for the pixels Pi3 and Pj2 in the same manner.

Figure 7D:
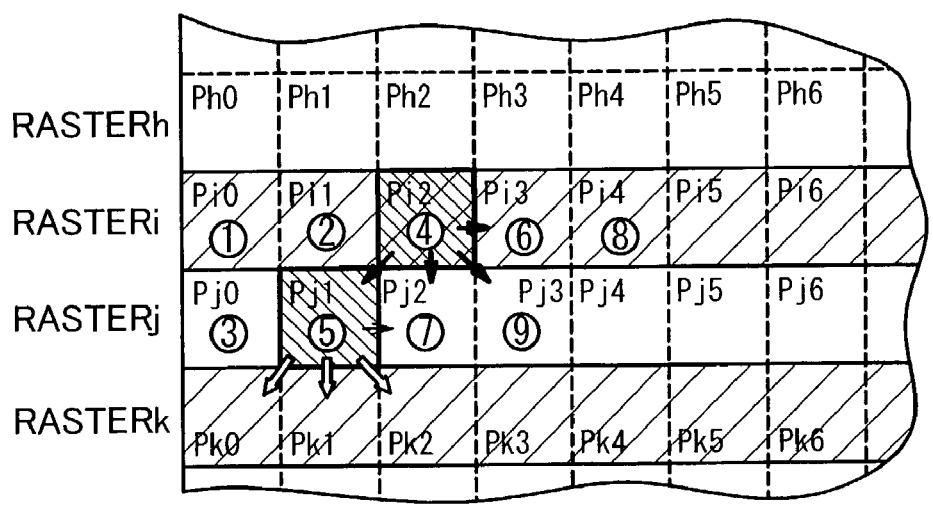

The numbers inside the circles in FIG. 7(d) indicate the sequence in which dot on-off state determination is conducted for the pixels of the raster (i) and the raster (j). As shown in the drawing, dot on-off state determination is conducted in an alternating manner for the pixels of the raster (i) and the pixels of the raster (j) located directly therebelow. When processing of the raster (i) and the raster (j) is carried out in a parallel manner in this way, the errors diffused into the pixels of the raster (j) can be stored in the registers, and the errors diffused into the pixels of the raster (k) can be stored in the RAM 106. Namely, the frequency of reading and writing of diffused errors to and from the RAM 106 can be reduced, and dot on-off state determination can be conducted more quickly to that extent.

Moreover, as shown in FIG. 7, as an exception to the general rule, because there is no pixel in the raster (j) below and to the left of the pixel at the leftmost edge of the raster (i), i.e., the pixel Pi0, processing is carried out for the pixel Pi1 comprising the next pixel in the same raster (i) following the pixel Pi0. Naturally, however, it is acceptable if a hypothetical pixel Pj-1 is assumed to exist below and to the left of the pixel Pi0, such that after processing of the hypothetical pixel Pj-1 is carried out following processing of the pixel Pi0, the result of dot on-off state determination for the hypothetical pixel Pj-1 is discarded without being used. This solution is preferred because it allows exceptional processing to be avoided, since normal processing can be carried out for the leftmost pixel vis-a-vis the hypothetical pixel.

Figure 8:
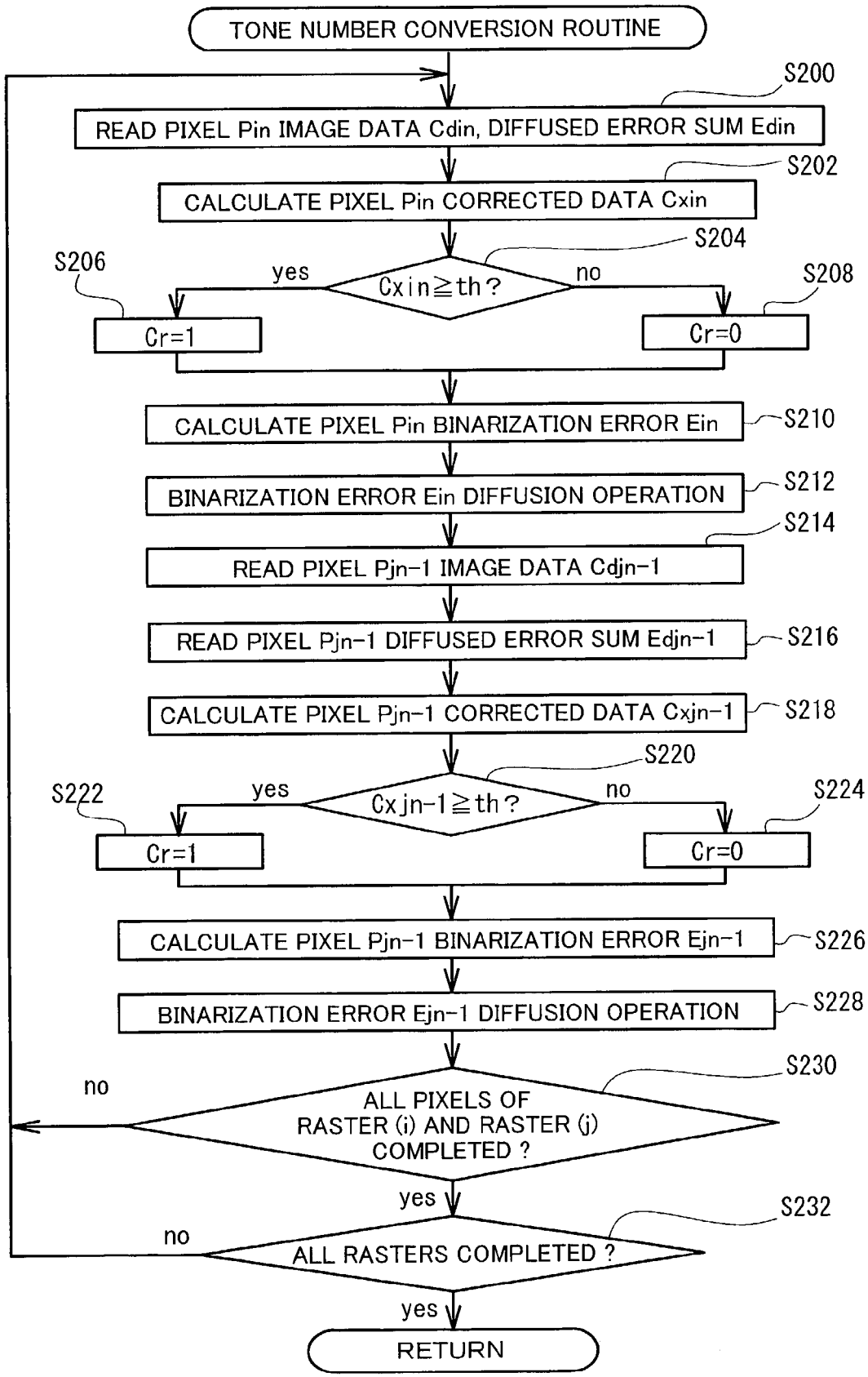
FIG. 8 is a flow chart showing the sequence of the tone number conversion routine of the first embodiment.

FIG. 8 is a flow chart showing the sequence of the routine in which dot on-off state determination is conducted in a parallel manner for two rasters. This routine is executed by the CPU 102 of the computer 100. As described above, the color printer of this embodiment is a printer that can form ink dots in the four colors of C, M, Y and K, and the tone number conversion routine shown in FIG. 8 is carried out for each color, but in order to avoid making the description below unduly complex, the colors of ink dots are not specified in the following description. Naturally, the routine may be applied in a six-color printer that includes LC ink and LM ink in addition to the four colors described above.

The color printer of this embodiment described above may also comprise a variable dot printer that can form dots of different sizes for each color. When a variable dot printer such as a variable dot printer that can form large, medium and small dots is used, the tone number conversion routine described below is executed for each dot having each of the various sizes.

Because increasing the number of ink colors used and the number of dot sizes that can be formed increases the number of times that the tone number conversion routine is executed, the amount of time required for execution of the routine also increases accordingly. Because the tone number conversion routine of this embodiment described below can be performed quickly, it may be advantageously applied in these situations as well.

When the tone number conversion routine of this embodiment is begun, the image data for the pixel that belongs to the first raster of the rasters to be processed in a parallel manner and for which dot on-off state determination is to be conducted, as well as the errors diffused into this pixel, are obtained (step S200). Here, the pixel to be processed is the nth pixel Pin of the raster (i). The image data Cdin and diffused error sum Edin are both stored in the RAM 106.

Corrected data Cxin for the pixel Pin is calculated by adding together the image data Cdin and the diffused error sum Edin for the pixel Pin (step S202). The obtained corrected data Cxin is compared with a predetermined threshold value th (step S204), and if the corrected data is larger than the threshold value, it is determined that the pixel Pin should contain a dot, and the value '1' representing the formation of a dot is written into the variable Cr indicating the determination result (step S206). If the corrected data is not larger than the threshold value, it is determined that the pixel Pin will not contain a dot, and the value '0' representing the non-formation of a dot is written into the variable Cr (step S208).

Once dot on-off state determination is conducted for the pixel Pin in the raster (i), the binarization error occurring in connection with this determination is calculated (step S210). The binarization error Ein can be sought by subtracting the tone value (result value) expressed for the pixel Pin in terms of dot formation or non-formation from the corrected data Cxin. The obtained binarization error is multiplied by each of the error diffusion coefficients, and the error values to be allocated to surrounding pixels are calculated. The error diffusion coefficient is set for each pixel in the error diffusion matrix. The error values to be diffused into the pixels of the raster (i) and the error value to be diffused into the pixels of the raster (j) located directly below the raster (i), which are sought in this manner, are stored in the registers (step S212). If there are any error portions to be diffused into other pixels, such as those to be allocated to the pixels of the raster (k), they are stored in the RAM 106.

Once dot on-off state determination and the diffusion of errors regarding the pixel of the raster (i) have been completed, dot on-off state determination for the pixel Pjn-1 of the raster j is begun. The image data Cdjn-1 for the pixel Pjn-1 is read out from the RAM 106 (step S214) and the diffused error sum Edjn-1 allocated to the pixel Pjn-1 is read in from the register (step S216). The diffused error value from the pixel Pin for which dot on-off state determination was previously performed is also accumulated in the diffused error sum Edjn-1 read in from the register. Where the pixel Pin of the raster (i) is the leftmost pixel Pi0, this process is performed with regard to the hypothetical pixel Pj-1.

Next, the image data Cdjn-1 and the diffused error sum Edjn-1 are added together and the corrected data Cxjn-1 is calculated (step S218), the obtained corrected data Cxjn-1 is compared with the predetermined threshold value th (step S220), and if the corrected data is larger than the threshold value, a dot is determined to be formed and the value '1' indicating dot formation is written into the variable Cr representing the determination result (step S222). If the corrected data is not larger than the threshold value, the value '0' indicating dot non-formation is written into the variable Cr (step S224). The binarization error Ejn-1 occurring in the pixel Pjn-1 together with this determination is then calculated (step S226). The binarization error Ejn-1 can be sought by subtracting the pixel Pjn-1 result value from the corrected data Cxjn-1. The error values to be diffused into the surrounding pixels are calculated by multiplying the binarization error thus obtained by the respective error diffusion coefficients. When the diffused error values have been sought in this manner, the values to be diffused into the pixels of the raster (j) are stored in the registers, while the values to be diffused into the pixels of the raster (k) are stored in the RAM 106 (step S228).

Once dot on-off state determination and error diffusion processing are completed for the pixel of the raster (i) and the raster (j), it is determined whether or not processing has been completed for all of the pixels of the raster (i) and the raster (j) (step S230). Where unprocessed pixels remain, the pixel position is moved one pixel to the right, i.e., 'n' is replaced with 'n+1' (step S232), the CPU 102 returns to step 200, and the next series of processes is performed. Where no unprocessed pixels remain, it is determined whether or not processing has been completed for all rasters (step S234), and where unprocessed rasters remain, the raster position is shifted two rasters down, i.e., 'i' is replaced with 'i+2' (step S236), the CPU 102 returns to step 200, and the next series of processes is performed. Where no unprocessed rasters remain, the tone number conversion routine shown in FIG. 8 is ended and the CPU 102 returns to the image data conversion routine shown in FIG. 4.

As described above, in the tone number conversion routine of the first embodiment, dot on-off state determination is conducted in a parallel and alternating manner for the pixels of the raster (i) and the pixels of the raster (j). When this is done, dot on-off state determination is conducted for a pixel of the raster (j) either after dot on-off state determination for a pixel of the raster (i) or shortly thereafter. Therefore, with regard to dot formation determination for the pixels of the raster (j), because determination can be made directly without storing in the error buffer the errors that are to be diffused from the pixels of the raster (i) into the surrounding pixels, the frequency with which errors are written to the error buffer can be reduced to that extent. If the frequency with which errors are written to the error buffer can be reduced, the time required for dot on-off state determination can be shortened accordingly, and therefore the tone number conversion routine can be executed more quickly to that extent.

In addition, where the storage capacity of the error buffer must be conserved, a routine is executed that enables the error buffer that was used for dot on-off state determination for one raster to be reused for such determination for a different raster. In this case as well, because in the tone number conversion routine of the first embodiment described above, the error buffer need only have the capacity to handle one raster for every two rasters, the number of total rasters regarding which diffused errors are stored in the error buffer can be cut in half. As a result, the capacity of the error buffer used during dot on-off state determination can be made smaller even where processing to reuse the buffer for such determination regarding another raster is not performed. Naturally, if processing of more than two rasters is carried out in a parallel manner, because the error buffer need only have the capacity to handle one raster for a given number of rasters, the capacity of the error buffer can be further reduced to that extent.

B-4. Modifications:

(1) First Modification

Figure 9:
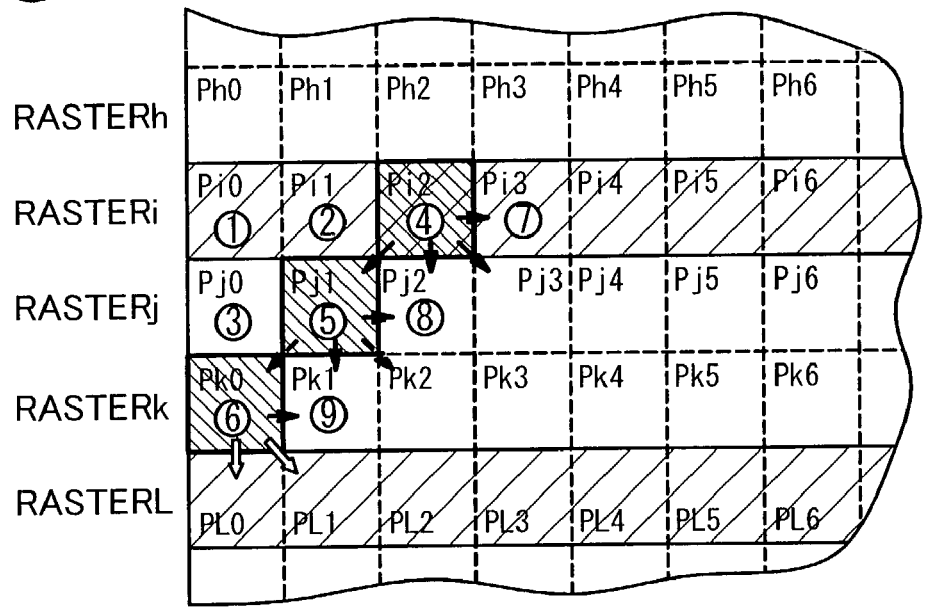
FIG. 9 is an explanatory drawing showing a conceptual view of the situation in which multiple rasters are processed in a parallel manner in a first modification of the tone number conversion process of the first embodiment.

The description above involved the simplest possible example, wherein dot on-off state determination was conducted for two rasters in a parallel manner. However, the number of rasters that may be processed in a parallel manner is not limited to two, and may comprise three or more. FIG. 9 is an explanatory drawing showing a conceptual view of the situation in which dot on-off state determination is conducted for three rasters in a parallel manner. In FIG. 9, dot on-off state determination is conducted for the three rasters (i), (j) and (k) in a parallel manner. In order to avoid making the description unduly complex, the error diffusion matrix shown in FIG. 6(a) is used here, as in the case shown in FIG. 7.

The hatched lines in the raster (i) and the raster (k) indicate that diffused errors allocated to these raster pixels are stored in the RAM 106. The numbers enclosed by circles located inside the pixels of the rasters (i), (j) and (k) indicate the order in which dot on-off state determination is conducted for each pixel. As shown in the drawing, dot on-off state determination is carried out for the first three pixels in the same order as when such determination was conducted in a parallel manner for the two rasters described referring to FIG. 7. From the fourth pixel onward, dot on-off state determination is conducted in a parallel manner in the order of the pixels from the rasters (i), (j) and (k), which are handled as one group. Here, since processing of the three rasters (i) through (k) is carried out in a parallel manner, the errors diffused into the pixels of these three rasters are used in a short period of time, and therefore they are stored in the registers of the CPU 102. Because the errors diffused into the pixels of the raster L are used only after processing of the three rasters (i) through (k) is completed, the errors diffused into the pixels of the raster L are stored in the RAM 106. By repeating these operations, dot on-off state determination for three rasters can be conducted in a parallel manner.

If dot on-off state determination for the three rasters (i) through (k) is conducted in a parallel manner as described above, the same effect as that achieved for parallel processing of the two adjacent rasters of (i) and (j) or (j) and (k) can be obtained.

Furthermore, if parallel processing of the rasters (i) and (k) is carried out, dot on-off state determination for a pixel of the raster (k) is conducted either after such determination for a pixel of the raster (i) or shortly thereafter. Therefore, because it is possible to conduct dot on-off state determination for the pixels of the raster (k) directly, without having to store errors from the pixels of the raster (i) that are to be diffused into surrounding pixels in the error buffer, the frequency of writing to the error buffer can be reduced and the time required for dot on-off state determination can be shortened accordingly.

(2) Second Modification:

In the various embodiments described above, in order to avoid making the description unduly complex, the error diffusion matrix used was the relatively small matrix shown in FIG. 6(a). Naturally, however, dot on-off state determination can be conducted in a parallel manner for the pixels of multiple rasters using this method even where a different error diffusion matrix is used. As one example, a situation in which dot on-off state determination is conducted in a parallel manner for two rasters using the error diffusion matrix shown in FIG. 6(b) will be explained below with reference to FIG. 10.

Figure 10A:
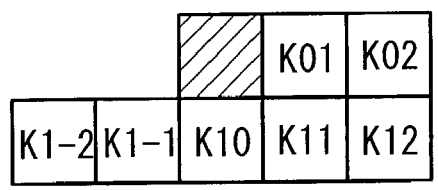
FIG. 10 is an explanatory drawing showing a conceptual view of the situation in which multiple rasters are processed in a parallel manner in a second modification of the tone number conversion process of the first embodiment.

For ease of understanding, the error diffusion matrix used is shown in FIG. 10(a). This matrix is identical to the matrix shown in FIG. 6(b). When this error diffusion matrix is used, the binarization error occurring in the target pixel shaded with hatched lines is diffused not only into a pixel adjacent to the target pixel, but also into a pixel adjacent to the adjacent pixel. As applied to FIG. 10(b), the binarization error occurring in the pixel Pj2, is diffused into the pixels Pi3 and Pi4 in the raster (i), and into the pixels Pj0 through Pj4 of the raster (j). Namely, in addition to the diffused error from the pixel Pi0 and the diffused error from the pixel Pi1 of the raster (i), the diffused error from the pixel Pi2 is also allocated to the pixel Pj0 of the raster (j). Accordingly, once dot on-off state determination for these three pixels in the raster (i) is completed, dot on-off state determination for the pixel Pj0 of the raster (j) is begun. That is, where the error diffusion matrix shown in FIG. 10(a) is used, the positional relationship between the pixel from the raster (i) and the pixel from the raster (j) is a relationship wherein the pixel from the raster (j) is two pixels behind the pixel from the raster (i). Where parallel processing of multiple rasters is carried out in this manner, the positional relationships between the pixels from each raster can be established in accordance with the range within which the binarization error is diffused. Dot on-off state determination for the pixels of the various rasters is conducted in a parallel manner while these positional relationships are maintained.

Figure 10B:
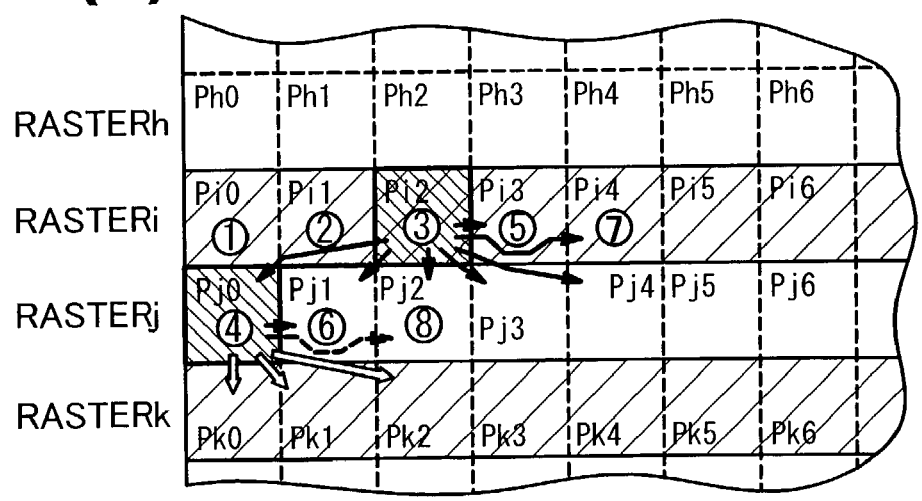

FIG. 10(b) is an explanatory drawing showing the situation in which dot on-off state determination for the Pixel Pi2 of the raster (i) and the pixel Pj0 of the raster (j) is conducted in a continuous manner. In the drawing, the numbers enclosed within the circles indicate the order in which dot on-off state determination is conducted as among the pixels of the rasters (i) and (j). In addition, the boldfaced arrows extending from the pixel Pi2 toward surrounding pixels indicate in a conceptual manner the manner in which the binarization error occurring in the pixel Pi2 is diffused among the surrounding pixels in accordance with the error diffusion matrix. Once the binarization error occurring in the pixel Pi2 is diffused among the surrounding pixels, dot on-off state determination for the pixel Pj0 is conducted. With regard to the binarization error occurring in the pixel Pj0, the diffused error portions allocated to the pixels of the raster (j) are stored in the registers of the CPU 102, while the diffused error portions allocated to the pixels of the raster (k) are stored in the RAM 106. The white arrows extending from the pixel Pj0 toward the pixels of the raster (k) indicate that the diffused error portions allocated to these pixels are stored in the RAM 106. As indicated by the numbers in the circles, dot on-off state determination for the pixels of the rasters (i) and (j) is conducted in an alternating manner in the order of Pj0, Pi3, Pj1. The diffused error portions allocated to the pixels of the raster (i) and the raster (j) are stored in the registers of the CPU 102, while the diffused error portions allocated to the pixels of the raster (k) are stored in the RAM 106. When dot on-off state determination is conducted for each pixel in the rasters (i) and (j) while the above operations are repeated, by shifting the position of the raster to be processed downward by two rasters and by repeating these operations for the pixels of the raster (k) and the raster immediately therebelow, dot on-off state determination can be conducted in a parallel manner for the two rasters using the error diffusion matrix shown in FIG. 10(a).

Where dot on-off state determination is conducted in a parallel manner for the rasters (i) and (j) as well, such determination is conducted for a pixel of the raster (j) either after that for a pixel of the raster (i) or within a short period of time thereafter. Therefore, because it is possible to conduct dot on-off state determination for the pixels of the raster (j) directly, without having to store errors from the pixels of the raster (i) that are to be diffused into surrounding pixels in the error buffer, the frequency of writing to the error buffer can be reduced and the time required for dot on-off state determination can be shortened accordingly.

(3) Third Modification:

In the various embodiments described above, the binarization error occurring in the target pixel were diffused in the pixels of the same raster as the target pixel and the pixels of the raster one raster below such raster, but the present invention is not limited to this implementation. For example, where the error diffusion matrix shown in FIG. 6(d) is used, the binarization error occurring in the target pixel is diffused into the pixels of the raster two rasters down from the raster containing the target pixel. FIG. 11 is an explanatory drawing showing a conceptual view of the situation in which dot on-off state determination is carried out for three rasters using the error diffusion matrix shown in FIG. 6(d).

Figures 11A, 11B:
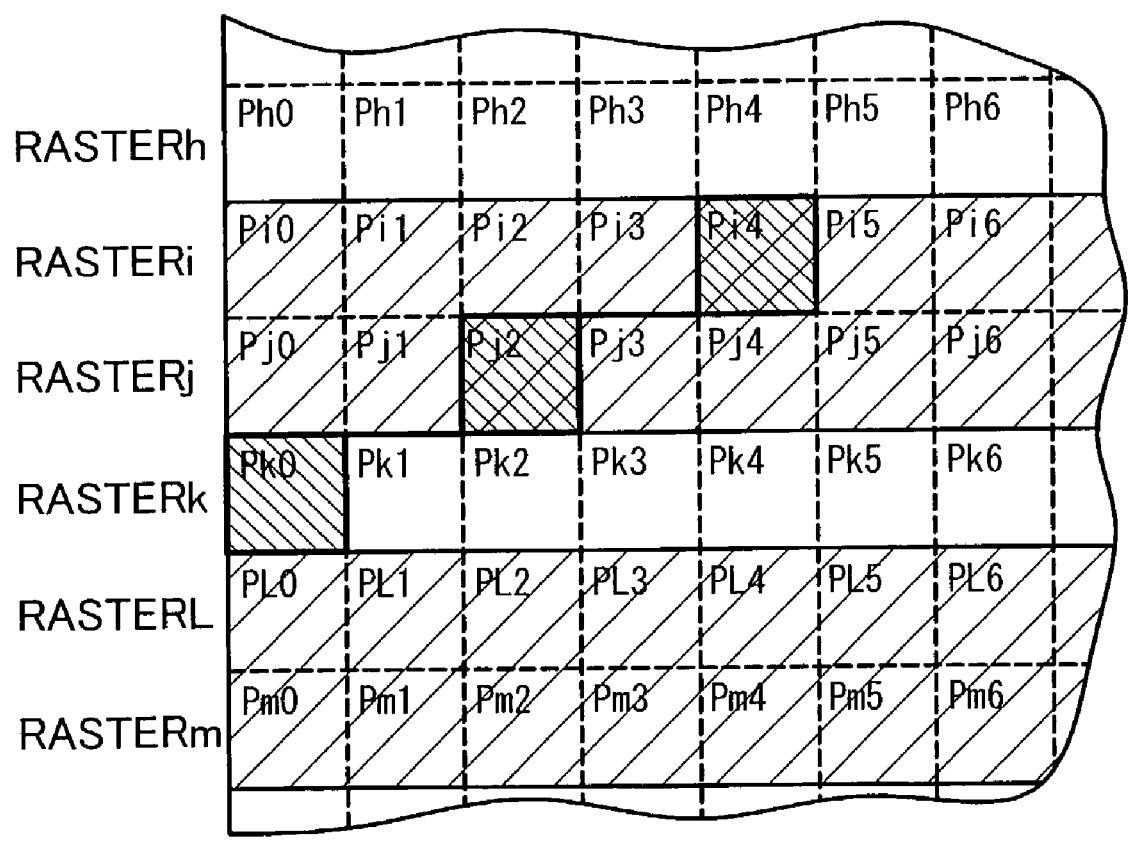
FIG. 11 is an explanatory drawing showing a conceptual view of the situation in which multiple rasters are processed in a parallel manner in a third modification of the tone number conversion process of the first embodiment.

For ease of understanding, the error diffusion matrix used is shown in FIG. 11(a). This matrix is the same matrix shown in FIG. 6(d). Here, it is assumed that dot on-off state determination is conducted in a parallel manner for the three rasters (i), (j) and (k). The binarization errors occurring in the pixels of the raster (k) are diffused into the pixels of the three rasters (k) through (m) in accordance with the error diffusion matrix shown in FIG. 11(a), but dot on-off state determination for the pixels of the two rasters (L) and (m) is conducted only after processing of the three rasters (i) through (k) is completed. Therefore, the errors diffused into pixels of the rasters (L) and (m) are stored in the RAM 106. In FIG. 11(b), the hatched lines[(2)] indicate pixels regarding which the diffused binarization errors are stored in the RAM 106. Where the error diffusion matrix shown in FIG. 11(a) is used in this manner, a raster regarding which the diffused binarization errors are stored in the registers of the CPU 102 alternates with a raster for which diffused errors are stored in the RAM 106.

(4) Fourth Modification:

Where binarization errors are diffused over a wide range of pixels, if such errors are diffused into pixels located at a predetermined distance or farther from the target pixel, they may be stored in the error buffer. For example, it is acceptable if errors to be diffused into pixels at a distance of 3 pixels or more from the target pixel are diffused into pixels for which error buffers are allocated and the error diffusion matrix shown in FIG. 12(a) is used. In FIG. 12(a), the indication of pixels from two different rasters, located at a distance from the target pixel, as a single unit surrounded by a dashed line, indicates that as between the two rasters in these regions, errors are stored for the raster for which an error buffer is allocated. This situation will now be explained more specifically with reference to FIGS. 12(b) and 12(c). Here, the target pixel is assumed to belong to a raster for which an error buffer is allocated. In this case, because error buffers are allocated for the raster containing the target pixel and the raster two rasters below this raster, errors are diffused in the same manner as they would be based on the matrix shown in FIG. 12(b). Next, if it is assumed that the target pixel is located in a raster that is not allocated an error buffer, because error buffers are allocated for the rasters above and below the raster containing the target pixel, the target pixel error is diffused in the same matter as it would be based on the matrix shown in FIG. 12(c).

As becomes clear when the error diffusion matrix of FIG. 12(a) is compared with the error diffusion matrix of FIG. 6(c), error portions diffused into the pixels K03 and K13 in FIG. 6(c) are diffused together into the region three pixels away from the target pixel in FIG. 12(a) (in the drawing, the region indicated as K3). Similarly, error portions diffused into the pixels K04 and K14 in FIG. 6(c) are diffused together into the region four pixels away from the target pixel in FIG. 12(a) (in the drawing, the region indicated as K4).

Experience has determined that where the error occurring in the target pixel is diffused into a pixel at a distance therefrom, there is no substantial deterioration in image quality even if the position of the pixel into which the error is diffused does not precisely match the calculated position. Accordingly, where binarization errors are diffused over a wide range, there is no deterioration in image quality even if such errors are diffused into distant pixels allocated error buffers. In the various embodiments described above, where errors are not diffused in error buffers, they are stored in the registers of the CPU 102. Accordingly, if errors diffused into distant pixels are stored in the error buffer, the use of registers used to conduct dot on-off state determination can be conserved to that extent. If there are fewer registers, in which errors are stored, processing can be simplified, and if the conserved registers are used for another purpose, dot on-off state determination can be conducted more quickly to that extent.

In the above description, errors were diffused into the pixels of two rasters, but if the error diffusion matrix shown in FIG. 12(d) is used, they can be diffused over three rasters. Where errors are diffused over an even larger number of rasters in this way, if errors diffused into distant pixels are diffused into pixels allocated error buffers, processing can be carried out more simply and quickly without a deterioration in image quality.

C. Second Embodiment:

In the various embodiments described above as the tone number conversion routine of the first embodiment, the binarization error occurring during dot on-off state determination for the target pixel was diffused into and stored in connection with surrounding pixels in accordance with error diffusion coefficients set in an error diffusion matrix. This means that the method of the first embodiment can be presumed to conform to the so-called error diffusion method. Dot on-off state determination for multiple rasters can also be conducted in a parallel manner using a method conforming to the so-called average error minimum method. The tone number conversion routine of this second embodiment will be explained below.

C-1. Tone Number Conversion Routine of the Second Embodiment:

FIG. 13 is an explanatory drawing to explain in a conceptual manner the principle by which dot on-off state determination is conducted quickly through parallel processing of multiple rasters in the tone number conversion routine of the second embodiment. Before proceeding to a detailed description of the tone number conversion routine of the second embodiment, as background for such description, a brief explanation of the method referred to as the average error minimum method will be provided with reference to FIG. 13.

Figure 13A:
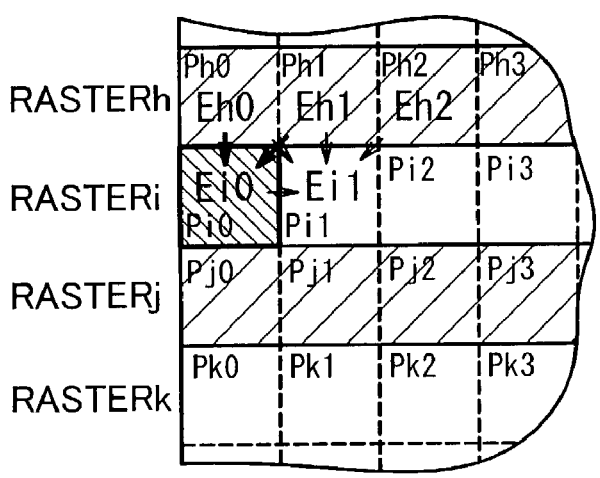
FIG. 13 is an explanatory drawing showing the principle of shortening processing time by performing parallel processing of multiple rasters in the tone number conversion routine of a second embodiment.
Figure 13B:
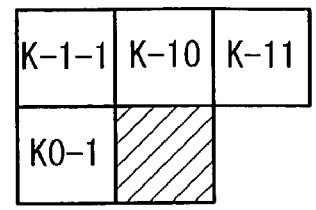

In the average error minimum method, where dot on-off state determination is conducted for the target pixel, binarization errors occurring in the surrounding pixels as to which dot on-off state determination has already been conducted are read out, and dot on-off state determination is conducted for the target pixel while taking into account these binarization errors. This operation will be explained with reference to FIG. 13(a). FIG. 13(a) is an explanatory drawing showing the situation in which dot on-off state determination is conducted for the pixel Pi0. Where dot on-off state determination is conducted for the pixel Pi0, first, the binarization errors occurring in the pixels Ph0 and Ph1 adjacent to the pixel Pi0 are each multiplied by a predetermined weighting coefficient, and the value obtained by adding together the results of these two operations is calculated. In FIG. 13(a), the presence of 'Eh0' and 'Eh1' in the pixels Ph0 and Ph1, respectively, indicates that the binarization errors Eh0 and Eh1 have occurred in those pixels. The image data for the pixel Pi0 is corrected using the thus calculated value, and dot on-off state determination is conducted based on the relative size of the obtained corrected value and a predetermined threshold value. The weighting coefficient by which the binarization error is multiplied is preset for each pixel based on the relative positional relationship of each pixel to the target pixel. FIG. 13(b) is an explanatory drawing showing the situation in which the weighting coefficient for each surrounding pixel is set relative to the target pixel. The pixel shaded by hatched lines in the drawing is the target pixel. For example, in the pixel to the left of the target pixel, 'K0-1' is assigned as the weighting coefficient. Naturally, however, the matrix that assigns weighting coefficients for each pixel surrounding the target pixel is not limited to the matrix shown in FIG. 13(b), and the various matrices shown in FIG. 14 may be used as well.

Once dot on-off state determination has been conducted for the pixel Pi0 as described above, dot on-off state determination is conducted for the pixel Pi1 adjacent thereto on the right. When dot on-off state determination is conducted for the pixel Pi1, dot on-off state determination is conducted while taking into account the binarization errors that occurred in the pixels Ph0, Ph1, Ph2 and Pi0, based on the matrix set in FIG. 13(b). When dot on-off state determination for the pixel Pi1 is completed, such determination is conducted for the pixel Pi2 adjacent thereto on the right. Dot on-off state determination is thereby conducted one pixel at a time along the raster. The binarization errors occurring due to dot on-off state determination are stored in the error buffer located in the RAM, and when dot on-off state determination is completed for all pixels in the raster currently being processed, they are read out once more from the error buffer in the RAM and used during processing of the raster located one raster below the previously processed raster.

As described above, in order to conduct dot on-off state determination using the average error minimum method, the binarization errors in the surrounding pixels must be read out from the error buffer located in the RAM each time that dot on-off state determination is conducted for a target pixel, and in order to use the binarization error occurring in the target pixel due to such determination in dot on-off state determination for other pixels, the error must be stored in the error buffer. Because of the need to frequently read and write binarization errors to and from the error buffer, dot on-off state determination takes more time to that extent.

By contrast, in the tone number conversion routine of the second embodiment described below, dot on-off state determination can be conducted quickly by carrying out parallel processing of multiple rasters. The principle behind this quick dot on-off state determination via parallel processing of multiple rasters will be explained below with reference to FIG. 13.

FIG. 13 is an explanatory drawing showing the principle behind dot on-off state determination conducted for two rasters in a parallel manner, as the simplest possible example. Here, dot on-off state determination is conducted in a parallel manner for the raster (i) and the raster (j) located directly therebelow.

First, dot on-off state determination is conducted for the leftmost pixel of the raster (i), i.e., the pixel Pi0. FIG. 13(a) shows a conceptual view of this dot on-off state determination for the pixel Pi0. The binarization error Eh0 for the pixel Ph0 and the binarization error Eh1 for the pixel Ph1 are used in order to conduct dot on-off state determination for the target pixel Pi0, as in the average error minimum method described above. These binarization errors are stored in the RAM 106 of the computer 100. The binarization errors read out from the RAM 106 are each multiplied by a weighting coefficient preset in the matrix of FIG. 13(b), and the image data for the target pixel Pi0 is corrected. Dot on-off state determination is then conducted based on the obtained corrected value. In FIG. 13(a), the boldfaced arrows pointing from the pixel Ph0 and the pixel Ph1 to the target pixel Pi0 indicate in a conceptual manner that the binarization errors for the pixels Ph0 and Ph1 are to be taken into account when conducting dot on-off state determination for the target pixel Pi0.

Once dot on-off state determination has been conducted for the pixel Pi0, the binarization error Ei0 occurring as a result thereof is stored temporarily in a register of the CPU 102, and dot on-off state determination for the pixel Pi1 adjacent to the pixel Pi0 on the right is begun. According to the weighting coefficients set in FIG. 13(b), when conducting dot on-off state determination for the pixel Pi1, the binarization errors that occurred in the pixels Ph0, Ph1, Ph2 and Pi0 are taken into account. In FIG. 13(a), the fine arrows that point from these pixels to the pixel Pi1 indicate in a conceptual manner that the binarization errors in these pixels are to be taken into account when conducting dot on-off state determination for the target pixel Pi1. In regard to the binarization error Eh0 for the pixel Ph0 and the binarization error Eh1 for the pixel Ph1 among these four binarization errors, the values previously used for dot on-off state determination for the pixel Ph0 are stored such that they can be re-used. For the binarization error Ei0 for the pixel Pi0, the previously sought value can be used. Therefore, if only the binarization error Eh2 for the pixel Ph2 is read out from the RAM 106, dot on-off state determination can be conducted for the pixel Pi1. The binarization error Ei1 occurring in the pixel Pi1 as a result of such determination is stored in a register of the CPU 102.

Figure 13C:
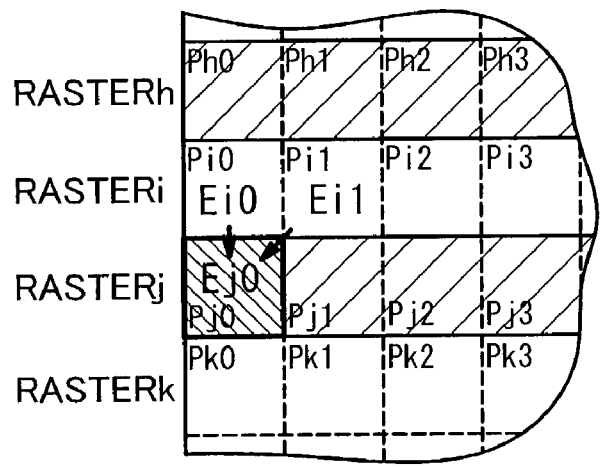

In the tone number conversion routine of the second embodiment, once dot on-off state determination has been conducted for the pixels Pi0 and Pi1 in the raster (i), it is then conducted for the pixel Pj0 in the raster (j). FIG. 13(c) is an explanatory drawing that shows in a conceptual manner the situation in which dot on-off determination is conducted for the pixel Pj0. As is clear from the matrix of FIG. 13(b), the dot on-off state for the pixel Pj0 can be determined taking into account only the binarization errors for the pixels Pi0 and Pi1. As described above, these binarization errors Ei0 and Ei1 are sought and stored in the registers of the CPU 102 immediately prior to dot on-off state determination for the pixel Pj0. Consequently, dot on-off state determination can be conducted for the pixel Pj0 without the need to read out binarization errors from the RAM 106. Once dot on-off state determination has been conducted for the pixel Pj0, the binarization error occurring in the pixel Pj0 is stored in a register of the CPU 102 and the error buffer of the RAM 106, whereupon dot on-off state determination is conducted in an alternating manner for the pixels of the raster (i) and the pixels of the raster (j).

The reason that the binarization error Ej0 occurring in the pixel Pj0 is stored in the error buffer of the RAM 106 is that after processing of the rasters (i) and (j) are completed, the binarization error Ej0 is used when dot on-off state determination is conducted for the pixels of the raster (k). Furthermore, the reason that the binarization error Ej0 for the pixel Pj0 is stored not only in the error buffer but also in a register of the CPU 102 is that it is used when dot on-off state determination is conducted for the pixel Pi1 adjacent thereto. When dot on-off state determination is conducted for the pixel Pi0 or the pixel Pi1 described above, the binarization errors stored in the RAM 106 in this way are read out and used. In FIG. 13, the hatched lines in the rasters (h) and (j) indicate that the binarization errors in these pixels are stored in the error buffer.

Figure 13D:
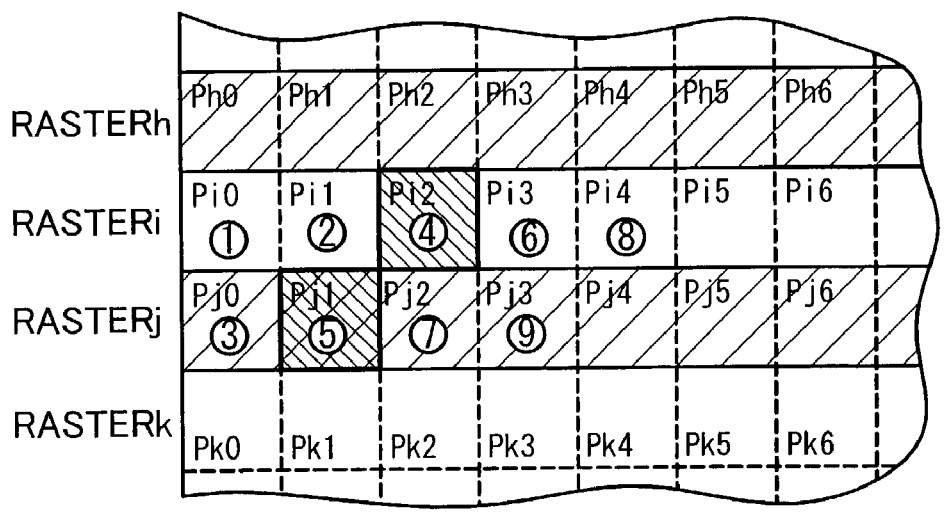

The numbers enclosed by circles in the pixels in FIG. 13(d) indicate the order in which dot on-off state determination is conducted for each pixel. As shown in FIG. 13(d), the pixel for which dot on-off state determination is conducted immediately following such determination for the pixel Pj0 is the pixel Pi2 in the raster (i). The binarization errors taken into account during dot on-off state determination for this pixel are the four tone values of the pixels Ph1, Ph2, Ph3 and Pi1. If the binarization errors used in the case of the pixel Pi1 described above are stored, dot on-off state determination can be conducted by reading out only the binarization error occurring in the pixel Ph3. After the pixel Pi2, dot on-off state determination is conducted for the pixel Pj1 in the raster (j). While dot on-off state determination for the pixel Pj1 uses the binarization errors for the pixels Pi1, Pi1, Pi2 and Pj0, these binarization errors are all sought immediately beforehand and stored in the registers of the CPU 102. Therefore, dot on-off state determination is conducted for the pixel Pj1 without reading out binarization errors from the RAM 106. When the binarization error Ej1 for the pixel Pj1 is sought in this manner, the binarization error Ej1 is stored in the registers of the CPU 102 and in the error buffer of the RAM 106.

As described above, dot on-off state determination is conducted in an alternating manner for the pixels of the raster (i) and the pixels of the raster (j) located below and to the left thereof. If processing of the raster (i) and the adjacent raster (j) is carried out in a parallel manner in this manner, dot on-off state determination can be conducted for the pixels of the raster (j) without the need to read out binarization errors from the RAM 106. Namely, because the frequency of reading and writing to and from the error buffer of the RAM 106 can be reduced accordingly, the time required to conduct dot on-off state determination can also be shortened.

As shown in FIG. 13, because there is no pixel in the raster (j) located below and to the left of the leftmost pixel of the raster (i), i.e., the pixel Pi0, processing of the pixel Pi1 that follows the pixel Pi0 in the same raster (i) is carried out as an exception. Naturally, however, it is acceptable if a hypothetical pixel Pj-1 is assumed to exist below and to the left of the pixel Pi0, and after processing of the hypothetical pixel Pj-1 is carried out following processing of the pixel Pi0, the result of dot on-off state determination for the hypothetical pixel Pj-1 is discarded without being used. This solution is preferred because it renders exceptional processing unnecessary, since normal processing can be carried out for the leftmost pixel vis-a-vis the hypothetical pixel.

Figure 15:
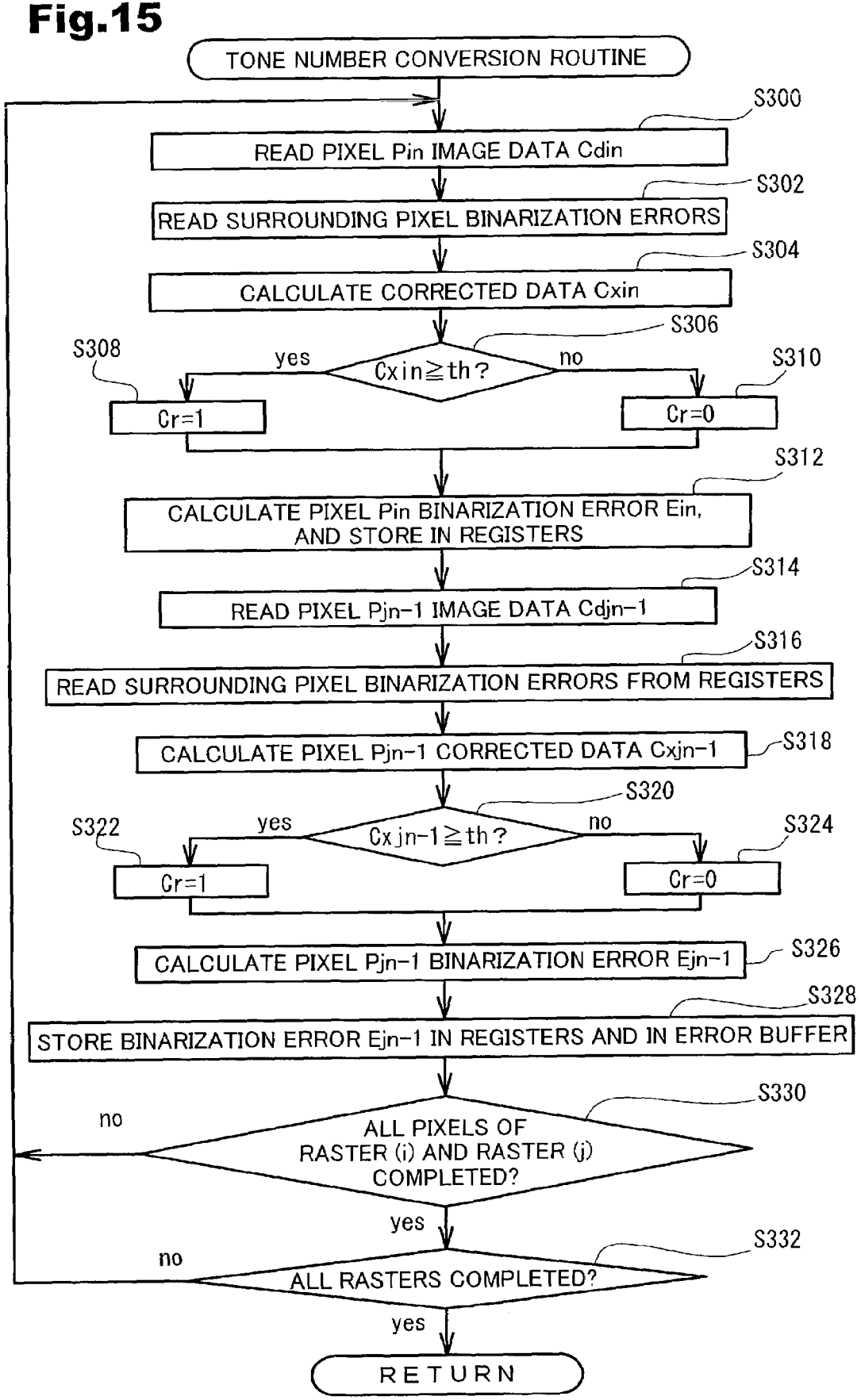
FIG. 15 is a flow chart showing the sequence of the tone number conversion routine of the second embodiment.

FIG. 15 is a flow chart showing the sequence of the routine in which dot on-off state determination is conducted in a parallel manner for two rasters. This routine is executed by the CPU 102 of the computer 100. As with the tone number conversion routine of the first embodiment, the tone number conversion routine of the second embodiment is executed for each color installed in the color printer, but in order to avoid making the description unduly complex, the ink dot color will not be specified below. Furthermore, where a so-called variable dot printer is used, the second embodiment is identical to the first embodiment in that the tone number conversion routine is executed for each dot size.

When the tone number conversion routine of the second embodiment is begun, first, the image data for the pixel for which dot on-off state determination and which belongs to the first raster of the rasters to be processed in a parallel manner is to be conducted is obtained (step S300). Here, the pixel to be processed (the target pixel) is the nth pixel Pin of the raster (i), as in the first embodiment. The image data Cdin is stored in the RAM 106.

The binarization errors for the pixels surrounding the target pixel Pin are then read out (step S302). 'Surrounding pixels' are the pixels located within a predetermined region relative to the target pixel, the binarization errors for which are taken into account when conducting dot on-off state determination for the target pixel. Pixels in various regions may be taken into consideration as the surrounding pixels in the dot on-off determination for the target pixel, but in order to avoid making the description unduly complex, the pixels shown in the matrix in FIG. 14(a) will be taken into account. When the surrounding pixel binarization errors are read out in step 302, it is acceptable if the binarization errors for each pixel read out when dot on-off state determination was conducted for the pixel Pin-1 to the left of the target pixel Pin are stored in the registers, as explained with reference to FIG. 13, and only the binarization errors not stored in the registers in step 302 are read out from the RAM 106.

Corrected data Cxin for the target pixel Pin is calculated based on the read out surrounding pixel binarization errors and the image data Cdin for the target pixel Pin (step S304). Namely, the corrected data Cxin is sought by multiplying the surrounding pixel binarization errors by the predetermined weighting coefficient assigned to each surrounding pixel and then calculating the sum of these products and the image data Cdin for the target pixel Pin. The surrounding pixel weighting coefficients are assigned to each pixel in the matrix shown in FIG. 14(a).

The obtained corrected data Cxin is compared with a predetermined threshold value th (step S306), and if the corrected data is larger than the threshold value, it is determined that the pixel Pin should contain a dot, and the value '1' representing the formation of a dot is written into the variable Cr indicating the determination result (step S308). If the corrected data is not larger than the threshold value, it is determined that the pixel Pin will not contain a dot, and the value '0' representing the non-formation of a dot is written into the variable Cr (step S310).

Once dot on-off state determination has been conducted for the pixel Pin in the raster (i), the binarization error occurring in connection with this determination is calculated and stored in the registers of the CPU 102(step S312). As in the first embodiment, the binarization error Ein can be sought by subtracting the result value for the pixel Pin from the corrected data Cxin.

After dot on-off state determination for the pixel Pin in the raster (i) is completed as described above and the binarization error is stored in a register of the CPU 102, the process of dot on-off state determination for the pixel Pjn-1 in the raster (j) located below and to the left of the pixel Pin is begun. First, the image data Cdjn-1 for the pixel Pjn-1 is read out from the RAM 106 (step S314), and the binarization errors for each of the surrounding pixels are read out from the registers of the CPU 102 (step S316). Where the pixel Pin is the pixel Pi0 at the left edge of the raster (i), the same process is carried out for the hypothetical pixel Pj-1.

The reason that the surrounding pixel binarization errors can be read out from the register and need not be read out from the error buffer of the RAM 106 in step S316 will now be explained. Because the surrounding pixels taken into account during the the dot on-off state determination process comprise the pixel range shown in FIG. 14(a) as described above. during dot on-off state determination for the pixel of the raster (j), the binarization errors for the pixels in the raster (j) to which the target pixel belongs, and the binarization errors for the pixels of the raster (i) located one raster above the raster (I) are taken into account. Here, because dot on-off state determination is conducted for the pixels of the raster (i) and the pixels of the raster (j) in a parallel manner, the pixels deemed surrounding pixels when dot on-off state determination is conducted for the pixels of the raster (j) are only those pixels as to which dot on-off state determination was conducted just a short time previously. Therefore, if binarization errors occurring in connection with dot on-off state determination for these pixels are stored in the registers of the CPU 102 for only a short period, all surrounding pixel binarization errors can be read out from the registers without the need to read them out from the error buffer of the RAM 106.

Once the surrounding pixel binarization errors are read out in regard to the pixel Pjn-1 as described above, dot on-off state determination is conducted as in the case of the pixel Pin, and the resulting binarization error is calculated. Namely, the corrected data Cxjn-1 is calculated based on the surrounding pixel binarization errors and the image data Cdjn-1 for the target pixel Pin-1 (step S318), the obtained corrected data Cxjn-1 is compared with the predetermined threshold value th (step S320), and if the corrected data is larger, it is determined that a dot is to be formed in the pixel Pin-1, and the value '1' representing dot formation is written into the variable Cr indicating the determination result (step S322). If the corrected data is smaller than the threshold value, it is determined that a dot is not to be formed in the pixel Pjn-1, and the value '0' representing dot non-formation is written into the variable Cr (step S324). The result value for the target pixel Pin-1 is then subtracted from the corrected data Cxjn-1 and the binarization error Ejn-1 occurring in the target pixel Pjn-1 is calculated.

Once the binarization error Ejn-1 occurring in the target pixel Pjn-1 in the raster (j) has been calculated as described above, the binarization error Ejn-1 is stored in the registers of the CPU 102 and in the error buffer of the RAM 106 (step S328). Here, the reason that binarization error is stored in the registers and in the error buffer is as follows. The binarization error Ejn-1 occurring in the target pixel Pjn-1 is used during dot on-off state determination for the adjacent pixel Pjn and in dot on-off state determination for the pixels of the raster (k) located one raster therebelow. Because the rasters (i) and (j) are processed in a parallel manner, dot on-off state determination for the adjacent pixel Pjn is conducted shortly thereafter, while dot on-off state determination for the pixels of the raster (k) is conducted only after processing of the rasters (i) and (j) has been completed. Therefore, the binarization error Ejn-1 occurring in the pixel Pjn-1 is stored in the registers of the CPU 102 for use in dot on-off state determination for the pixel Pjn, and is also stored in the RAM 106 error buffer for use in dot on-off state determination for the raster (k).

Once dot on-off state determination is completed for the pixels of the rasters (i) and (j) as described above, it is determined whether or not processing of all pixels in the rasters (i) and (j) has been completed (step S330). Where unprocessed pixels remain, the pixel position is shifted one pixel to the right, i.e., the value 'n+1' is substituted for the value 'n', the CPU 102 returns to step 200, and the next series of processes is performed. Where no unprocessed pixels remain, it is determined that processing has been completed for all rasters (step S332), and where unprocessed rasters remain, the raster position is shifted two rasters down, i.e., 'i' is replaced with 'i+2', the CPU 102 returns to step 200, and the next series of processes is performed. Where no unprocessed rasters remain, the tone number conversion routine shown in FIG. 15 is ended and the CPU 102 returns to the image data conversion routine shown in FIG. 4.

As described above, according to the tone number conversion routine of the second embodiment, dot on-off state determination is conducted in a parallel and alternating manner for the pixels of the raster (i) and the pixels of the raster (j). When this is done, because dot on-off state determination for a pixel in the raster (j) is conducted following such determination for a pixel of the raster (i) or shortly thereafter, dot on-off state determination for the pixels in the raster (j) can be conducted even if the binarization errors occurring in the pixels of the raster (i) are not stored in the error buffer. If the binarization errors occurring in the pixels of the raster (i) need not to be stored in the error buffer, because the frequency of writing to the error buffer can be reduced accordingly, dot on-off state determination can be carried out more quickly. Naturally, the number of rasters processed in a parallel manner is not limited to two, and it is acceptable if dot on-off state determination is conducted in a parallel manner for more than two rasters. As the number of rasters that undergo parallel processing increases, the frequency of writing to the error buffer decreases, thereby enabling dot on-off state determination to be conducted more quickly to that extent, which is preferred.

C-2. Modifications:

The tone number conversion routine of the second embodiment described above determines the dot on-off state using a method that conforms to the so-called average error minimum method. Namely, the binarization error occurring in a target pixel is stored for the target pixel, and when dot on-off state determination is conducted for a new pixel, it is conducted while taking into account the binarization errors stored in connection with the surrounding pixels. In the tone number conversion routine of the first embodiment described above, the dot on-off state is determined using a method that conforms to the so-called error diffusion method. Namely, the binarization error occurring in a target pixel is diffused into the surrounding pixels, and when dot on-off state determination is conducted for a new pixel, it is conducted while taking into account the diffused errors diffused from surrounding pixels that previously underwent dot on-off state determination. However, it is also possible to conduct dot on-off state determination using both the average error minimum method and the error diffusion method. A brief description of this modification of the second embodiment will be provided below.

FIG. 16 is an explanatory drawing showing a conceptual view of the tone number conversion routine of a modification of the second embodiment. To avoid making the description unduly complex, the rasters (i) and (j) are processed in a parallel manner in this description. When the binarization error is diffused into the surrounding pixels, it is diffused in accordance with the simple error diffusion matrix shown in FIG. 6(a), and when dot on-off state determination is conducted taking into account the surrounding pixel binarization errors, the binarization errors for each pixel in accordance with the simple matrix shown in FIG. 14(a) are taken into account.

Figure 16A:
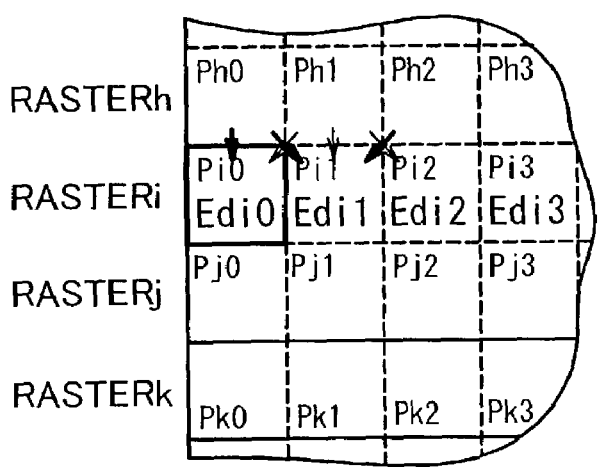
FIG. 16 is an explanatory drawing showing a conceptual view of the situation in which multiple rasters are processed in a parallel manner in a first modification of the tone number conversion process of the second embodiment.
Figure 16B:
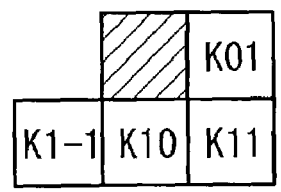

FIG. 16(a) is an explanatory drawing showing the situation in which the dot on-off state is determined for the pixel Pi0 at the left edge of the raster (i). The binarization errors occurring in each pixel of the raster (h) during dot on-off state determination are diffused and stored in connection with the pixels of the raster (i). For example, the error sum Edi0 diffused from the raster (h) is stored in connection with the pixel Pi0, the error sum Edi1 diffused from the raster (h) is stored in connection with the pixel Pi1, and the diffused error sum Edi2 is stored in connection with the pixel Pi2. For ease of understanding, the error diffusion matrix used is shown in FIG. 16(b). In addition, the arrows pointing from the pixels of the raster (h) toward the pixels of the raster (i) indicate in a conceptual manner the diffusion of errors from each pixel.

Once dot on-off state determination has been conducted for the pixel Pi0, the binarization error Ei0 occurring in connection with such determination is stored in the registers of the CPU 102, and dot on-off state determination for the pixel adjacent thereto on the right, i.e., the pixel Pi1, is then begun. Dot on-off state determination for the pixel Pi1 is conducted in the same manner as in the tone number conversion routine of the first embodiment described with reference to FIG. 7. Namely, the binarization error sum Edi1 diffused and accumulated beforehand in connection with the pixel Pi1 is read out, and dot on-off state determination is conducted based on the image data while taking into account this diffused error sum Edi1 and the error diffused from the pixel Pi0 for which dot on-off state determination has just been conducted. After dot on-off state determination is conducted for the pixel Pi1 in this manner, the binarization error Ei1 occurring due to such determination is stored in the registers of the CPU 102, as in the case of the pixel Pi0.

Figure 16C:
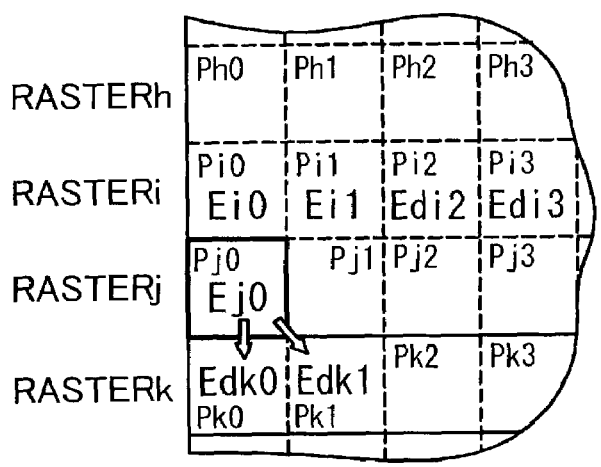

Once dot on-off state determination has been conducted for the pixels Pi0 and Pi1 of the raster (i) as described above, dot on-off state determination is conducted for the pixel Pj0 at the left edge of the raster (j). FIG. 16(c) is an explanatory drawing showing the situation in which dot on-off state determination is conducted for the pixel Pj0 in the raster (j). Here, dot on-off state determination for the pixel Pj0 in the raster (j) is conducted using a method that conforms to the average error minimum method. Namely, dot on-off state determination is conducted while taking into account surrounding pixel binarization errors subjected to a predetermined weighting established for each pixel in accordance with a matrix. For ease of understanding, the matrix used is shown in FIG. 16(d).

Figure 16D:
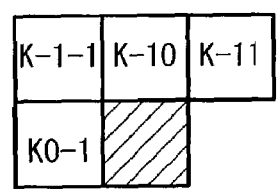

As can be seen from the matrix shown in FIG. 16(d), it is acceptable if binarization errors occurring in the pixels Pi0 and Pi1 are taken into account when dot on-off state determination is conducted for the pixel Pj0. As described above, because these binarization errors have been already sought and stored in the registers of the CPU 102, dot on-off state determination for the pixel Pj0 can be conducted quickly. Because the binarization error Ej0 occurs as a result of this dot on-off state determination for the pixel Pj0, it is allocated to the surrounding pixels in the raster (k) as a diffused error in accordance with an error diffusion matrix. For the allocation of diffused errors, the error diffusion matrix shown in FIG. 16(b) is used. Because parallel processing of the pixels of the rasters (i) and (j) is carried out here, dot on-off state determination for the pixels of the raster (k) is conducted only after the processing of these rasters is completed. Accordingly, errors diffused into the pixels of the raster (k) are accumulated in the error buffer of the RAM 106. In FIG. 16(c), the white arrows pointing from the pixel Pj0 toward the raster (k) pixels Pk0 and Pk1 indicate that the diffused error portions allocated to those pixels are stored in the error buffer of the RAM 106.

Figure 16E:
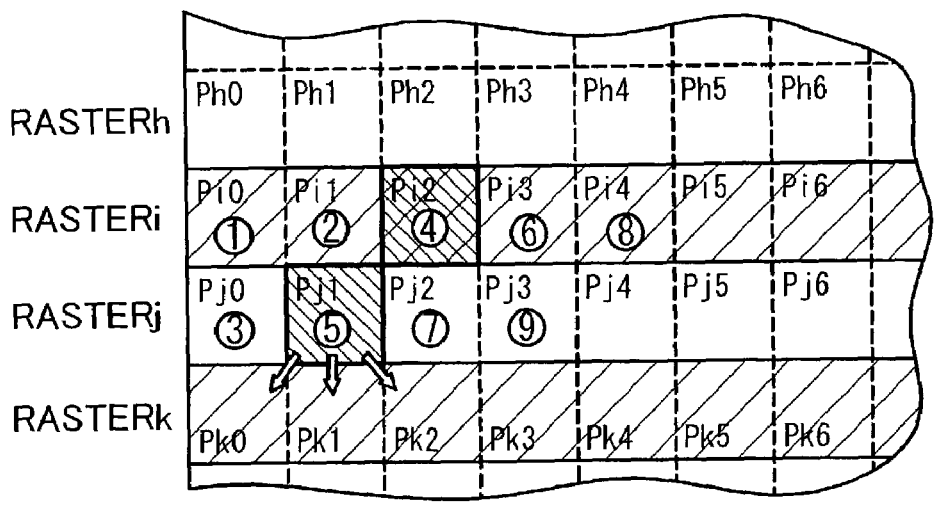

As described above, dot on-off state determination is conducted for the pixels of the raster (i) in accordance with the error diffusion method, while dot on-off state determination is conducted for the pixels of the raster (j) in accordance with the average error minimum method. Binarization errors occurring in the pixels of the raster (j) are diffused into surrounding pixels in accordance with the error diffusion method. By repeating these operations, the dot on-off state of the pixels in the rasters (i) and (j) can be conducted in an alternating manner. FIG. 16(e) is an explanatory drawing showing a conceptual view of this process. In FIG. 16(e), the fact that the diffused errors from the raster (h) are stored in connection with the pixels of the raster (i) is indicated by the hatched lines in the pixels of the raster (i). Similarly, the fact that the diffused errors from the raster (j) are stored in connection with the pixels of the raster (k) is indicated by the hatched lines in the pixels of the raster (k). Furthermore, the numbers enclosed in circles in FIG. 16(e) indicate the order in which dot on-off state determination is conducted for those pixels. As shown in the drawing, by grouping each pixel in the raster (i) with the pixel below and to the left of such pixel in the raster (j), and conducting dot on-off state determination while successively moving the position of each such group one pixel to the right, the rasters (i) and (j) can be processed in a parallel manner.

If dot on-off state determination is conducted for the pixels of the rasters (i) and (j) in a parallel and alternating manner, dot on-off state determination can conducted for the pixels of the raster (j) using the binarization errors occurring in the pixels of the raster (i), and it is no longer necessary to stored the binarization errors for the pixels of the raster (i) in the error buffer. As a result, the frequency of writing to the error buffer can be reduced, enabling dot on-off state determination to be conducted more quickly.

In the above description, while a method conforming to the error diffusion method was applied during dot on-off state determination for the pixels of the raster (i), and a method conforming to the average error minimum method was applied during dot on-off state determination for the pixels of the raster (j), the same results will naturally be achieved if a method conforming to the average error minimum method is applied during dot on-off state determination for the pixels of the raster (i), and a method conforming to the error diffusion method is applied during dot on-off state determination for the pixels of the raster (j).

In the modification of the second embodiment described above, parallel processing of the two rasters (i) and (j) was performed, but it is naturally also acceptable if dot on-off state determination for the pixels of more than two rasters is conducted in a parallel manner.

While various embodiments were described above, the present invention is not limited to these embodiments, and may be implemented in various ways within the essential scope of the invention. For example, it is acceptable if the software program (application program) that implements the functions described above is supplied to the computer system main memory or to an external memory device over communication lines and executed therefrom. Naturally, it is also acceptable if a software program stored on a CD-ROM or floppy disk is read and executed.

In the various embodiments described above, an image data conversion routine including a tone number conversion routine was executed within the computer, but it is also acceptable if part or all of the image data conversion routine is executed on the printer side, or using a dedicated image processing apparatus.

Furthermore, it is acceptable if the video display apparatus is not limited to a printing apparatus that prints images by forming ink dots on a printing medium, and may comprise a liquid crystal display apparatus that expresses images in which the tone changes continuously by, for example, distributing the luminescent spots on the liquid crystal display screen at an appropriate density.

INDUSTRIAL APPLICABILITY

As described above, because the image processing apparatus, printing control apparatus and image processing method of the present invention enable image data to be quickly converted without image quality deterioration, they may be advantageously applied in an image output apparatus. In particular, they may be advantageously applied in a printing apparatus that handles large blocks of image data and prints high-quality images, or prints images at high speed without deterioration of image quality.

The invention claimed is:

1. An image processing apparatus that converts image data into a specific expression format based on the dot on-off state by receiving image data representing tone values for each pixel and determining the dot on-off state for each pixel along a raster which is a row of such pixels, said image processing apparatus comprising:

a raster grouping module that generates a raster group by grouping multiple rasters arranged in an entire width direction of an image;

a last raster conversion module that selects the last raster at the end of said raster group, and by conducting dot on-off state determination for each pixel included in this last raster, converts the last raster into a dot row that indicates the dot on-off state;

a first error diffusion module that calculates the binarization error arising in each pixel included in the last raster due to said dot on-off state determination and diffuses the error among multiple state-undetermined pixels in the vicinity of each such pixel;

a first raster conversion module that selects the first raster located in the top position among the rasters in the raster group adjacent to the last raster and, by determining the dot on-off state for each pixel included in the first raster while taking into account the binarization errors diffused from the last raster among the pixels in this first raster, converts the first raster into a dot row that indicates the dot on-off state;

a second error diffusion module that diffuses the binarization error occurring in each pixel included in the first raster among the state-undetermined pixels in the vicinity of each such pixel; and a remaining raster conversion module that converts the remaining raster other than the first raster of the raster group into a dot row in parallel with the conversion of the first raster into a dot row by determining the dot on-off state for each pixel in the remaining raster while taking into account the binarization errors that were diffused from the pixels that belong to the same raster group as the remaining raster and previously underwent dot on-off state determination, and wherein said first error diffusion module and said second error diffusion module are modules that store in a first error storage unit the errors that are diffused into pixels belonging to a raster group different from that containing the pixels as to which said dot on-off state determination has been conducted, and store in a second error storage unit the errors that are diffused into pixels belonging to the same raster group as the pixels as to which said dot on-off state determination has been conducted.

2. An image processing apparatus in accordance with claim 1, wherein said second error storage unit is a storage unit regarding which at least one of the operations of data storage or data reading is performed more quickly than with regard to said first error storage unit.

3. An image processing apparatus in accordance with claim 1, wherein said first error storage unit simultaneously stores at least as many diffused errors as the number of pixels included in said first raster, and said second error storage unit simultaneously stores fewer diffused errors than the number of pixels included in said first raster.

4. An image processing apparatus in accordance with claim 3 that converts said image data using a computer, wherein said first error storage unit is a storage element to and from which said computer reads and writes data indirectly, and said second error storage unit is a storage element to and from which said computer reads and writes data directly.

5. An image processing apparatus in accordance with claim 1, wherein said first error diffusion module is a module that, when diffusing errors into pixels of a raster group different from the raster group containing the pixels as to which said dot on-off state determination has been performed, diffuses the errors only into those pixels in said first raster adjacent to said last raster.

6. An image processing apparatus in accordance with claim 1, wherein said raster group generating module generates said raster group by grouping two of said rasters that are adjacent, said first error diffusion module diffuses said binarization errors into the pixels of said last raster and into the pixels of said first raster that is adjacent to the last raster, said second error diffusion module diffuses said binarization errors that occur in the pixels of said first raster into the pixels of the first raster and into the pixels of said last raster that follows said first raster, and said remaining raster conversion module converts said last raster into a dot row in a parallel manner with the conversion of said first raster.

7. An image processing apparatus in accordance with claim 1, wherein at least one of said first error diffusion module or said second diffusion module is a module that, when said binarization errors are diffused into pixels that are distant from the pixels in which such binarization errors occurred by a predetermined number of pixels, diffuses them only into pixels belonging to a raster group different from the raster group that contains the pixels for which said dot on-off state determination has been conducted.

8. An image processing apparatus that converts image data into a specific expression format based on the dot on-off state, by receiving image data representing tone values for each pixel and determining the dot on-off state for each pixel along a raster which is a row of such pixels, said image processing apparatus comprising:

a raster grouping module generates a raster group by grouping multiple rasters arranged in an entire width direction of an image;

a selected raster conversion module selects at least a last raster located at the end of said raster group, and by conducting dot on-off state determination for each pixel included in the selected raster, converts the selected raster into a dot row indicating the dot on-off state;

a first binarization error storage module calculates the binarization error arising in each pixel included in the selected raster due to each dot on-off state determination and stores it in a first storage unit while associating it with each state-determined pixel;

a first raster conversion module selects the first raster located in the top position among the rasters in the raster group adjacent to the last raster, and by determining the dot on-off state for each such pixel included in the first raster while taking into consideration the binarization errors stored in association with the dot state-determined pixels in the vicinity of each pixel included in the first raster, converts the first raster into a dot row;

a second binarization error storage module stores the binarization error occurring in each pixel of the first raster in a second storage unit while associating it with each dot state-determined pixel; and a remaining raster conversion module converts the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

9. An image processing apparatus in accordance with claim 8, wherein said second storage unit is a storage unit regarding which at least one of the operations of data storage or data reading is performed more quickly than said first storage unit.

10. An image processing apparatus in accordance with claim 8, wherein said first error storage unit simultaneously stores as many binarization errors that occur in the pixels included in said last raster as the number of pixels that constitute the last raster, and said second error storage unit simultaneously stores fewer diffused errors that occur in the pixels included in said first raster than the number of pixels that constitute the first raster.

11. An image processing apparatus in accordance with claim 8 that performs conversion of said image data using a computer, wherein said first storage unit is a storage element to or from which a processing unit of said computer writes or reads data indirectly, and said second storage unit is a storage element to or from which the processing unit of said computer writes or reads data directly.

12. An image processing apparatus in accordance with claim 8, wherein said first binarization error storage module stores in said first storage unit only binarization errors that occur in the pixels included in said last raster among the rasters of said raster group.

13. An image processing apparatus in accordance with claim 8, wherein said raster grouping module generates said raster group by grouping together two adjacent rasters, said first binarization error storage module stores in said first storage unit only binarization errors that occur in said last raster, and said remaining raster conversion module converts said last raster into a dot row in a parallel manner with the conversion of said first raster.

14. An image processing apparatus in accordance with claim 1 or claim 8, wherein said remaining raster conversion module converts said remaining raster into a dot row by conducting dot on-off state determination while taking into account said binarization errors that were diffused from the pixels that belong to the same raster group as the remaining raster and previously underwent dot on-off state determination.

15. An image processing apparatus in accordance with claim 1 or claim 8, wherein said remaining raster conversion module converts said remaining raster into a dot row by conducting dot on-off state determination while taking into account said binarization errors that occurred in and associated with the pixels that belong to the same raster group as the remaining raster and previously underwent dot on-off state determination.

16. A printing control apparatus that converts image data into a specific expression format based on the dot on-off state by receiving image data representing tone values for each pixel and determining the dot on-off state for each pixel along a raster which is a row of such pixels, and controls a printing unit that prints images by forming ink dots on a printing medium by outputting print data to the printing unit, said printing control apparatus comprising:
- a raster grouping module that generates a raster group by grouping multiple rasters arranged in an entire width direction of an image;
- a last raster conversion module that selects the last raster at the end of said raster group, and by conducting dot on-off state determination for each pixel included in this last raster, converts the last raster into a dot row that indicates the dot on-off state;
- a first error diffusion module that calculates the binarization error arising in each pixel included in the last raster due to said dot on-off state determination and diffuses the error among multiple state-undetermined pixels in the vicinity of each such pixel;
- a first raster conversion module that selects the first raster located in the top position among the rasters in the raster group adjacent to the last raster and, by determining the dot on-off state for each pixel included in the first raster while taking into account the binarization errors diffused from the last raster among the pixels in this first raster, converts the first raster into a dot row that indicates the dot on-off state;
- a second error diffusion module that diffuses the binarization error occurring in each pixel included in the first raster among the state-undetermined pixels in the vicinity of each such pixel;
- a remaining raster conversion module that converts the remaining raster other than the first raster of the raster group into a dot row in parallel with the conversion of the first raster into a dot row by determining the dot on-off state for each pixel in the remaining raster while taking into account the binarization errors that were diffused from the pixels that belong to the same raster group as the remaining raster and previously underwent dot on-off state determination; and
- a print data output module that outputs to said printing unit as said print data the dot row for said converted first raster and the dot row for said remaining raster,
wherein said first error diffusion module and said second error diffusion module are modules that store in a first error storage unit the errors that are diffused into pixels belonging to a raster group different from that containing the pixels as to which said dot on-off state determination has been conducted, and store in a second error storage unit the errors that are diffused into pixels belonging to the same raster group as the pixels as to which said dot on-off state determination has been conducted.

17. A printing control apparatus that converts image data into a specific expression format based on the dot on-off state by receiving image data representing tone values for each pixel and determining the dot on-off state for each pixel along a raster which is a row of such pixels, and controls a printing unit that prints images by forming ink dots on a printing medium by outputting print data to the printing unit, said printing control apparatus comprising:
- a raster grouping module generates a raster group by grouping multiple rasters arranged in an entire width direction of an image;
- a selected raster conversion module selects at least a last raster located at the end of said raster group, and by conducting dot on-off state determination for each pixel included in the selected raster, converts the selected raster into a dot row indicating the dot on-off state;
- a first binarization error storage module calculates the binarization error arising in each pixel included in the selected raster due to each dot on-off state determination and stores it in a first storage unit while associating it with each state-determined pixel;
- a first raster conversion module selects the first raster located in the top position among the rasters in the raster group adjacent to the last raster, and by determining the dot on-off state for each such pixel included in the first raster while taking into consideration the binarization errors stored in association with the dot state-determined pixels in the vicinity of each pixel included in the first raster, converts the first raster into a dot row;
- a second binarization error storage module stores the binarization error occurring in each pixel of the first raster in a second storage unit while associating it with each dot state-determined pixel;
- a remaining raster conversion module converts the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination; and
- a print data output module that outputs to said printing unit as said print data the dot row for said converted first raster and the dot row for said remaining raster.

18. An image processing method for converting image data into a specific expression format based on the dot on-off state by receiving image data representing tone values for each pixel and determining the dot on-off state for each pixel along a raster which is a row of such pixels, said image processing method comprising the steps of:
- (A) generating a raster group by grouping multiple rasters arranged in an entire width direction of an image;
- (B) selecting the last raster at the end of the said raster group and determining the dot on-off state for each pixel included in this last raster, thereby converting the last raster into a dot row that indicates the dot on-off state;
- (C) calculating the binarization error arising in each pixel due to this dot on-off state determination and diffusing it among multiple state-undetermined pixels in the vicinity of each such pixel;
- (D) selecting the first raster located in the top position among the rasters in the raster group adjacent to the last raster, and converting the first raster into a dot row that indicates the dot on-off state by determining the dot on-off state for each pixel included in the first raster while taking into consideration the binarization errors diffused from the last raster among the pixels of said first raster;

(E) diffusing the binarization error occurring in each pixel included in the first raster among the state-undetermined pixels in the vicinity of each such pixel; and (F) converting the remaining raster other than the first raster of the raster group into a dot row in parallel with the conversion of the first raster into a dot row, by determining the dot on-off state for each pixel in the remaining raster while taking into account the binarization errors that were diffused from the pixels that belong to the same raster group as the remaining raster and previously underwent dot on-off state determination, wherein the steps (C) and (E) are steps whereby the errors that are diffused into pixels belonging to the same raster group as the pixels as to which said dot on-off state determination has been conducted are stored separately from the errors that are diffused into pixels belonging to a different group.

19. An image processing method for converting image data into a specific expression format based on the dot on-off state, by receiving image data representing tone values for each pixel and determining the dot on-off state for each pixel along a raster which is a row of such pixels, said image processing method comprising the steps of:

(A) generating a raster group by grouping multiple rasters arranged in an entire width direction of an image;

(B) selecting at least a last raster located at the end of said raster group and conducting dot on-off state determination for each pixel included in the selected raster, thereby converting the selected raster into a dot row indicating the dot on-off state;

(C) calculating the binarization error arising in each pixel included in the selected raster due to this dot on-off state determination and storing it in a first storage unit while associating it with each state-determined pixel;

(D) selecting the first raster located in the top position among the rasters in the raster group adjacent to the last raster and converting the first raster into a dot row by determining the dot on-off state for each such pixel while taking into consideration the binarization errors stored in connection with the dot state-determined pixels in the vicinity of each pixel comprising the first raster;

(E) storing the binarization error occurring in each pixel of the first raster in a second storage unit separately from the binarization error stored in the step (C) while associating it with each state-determined pixel; and (F) converting the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

20. A recording medium on which is recorded a computer-readable program that implements a method to convert image data into a specific expression format based on the dot on-off state by receiving image data indicating tone values for each pixel and determining the dot on-off state for each pixel along a raster which is a row of such pixels, said program causing a computer attain the functions of:

(A) generating a raster group by grouping multiple rasters arranged in an entire width direction of an image;

(B) selecting the last raster at the end of the said raster group and determining the dot on-off state for each pixel included in this last raster, thereby converting the last raster into a dot row that indicates the dot on-off state;

(C) calculating the binarization error arising in each pixel due to this dot on-off state determination and diffusing it among multiple state-undetermined pixels in the vicinity of each such pixel;

(D) selecting the first raster located in the top position among the rasters in the raster group adjacent to the last raster, and converting the first raster into a dot row that indicates the dot on-off state by determining the dot on-off state for each pixel included in the first raster while taking into consideration the binarization errors diffused from the last raster among the pixels of said first raster;

(E) diffusing the binarization error occurring in each pixel included in the first raster among the state-undetermined pixels in the vicinity of each such pixel; and (F) converting the remaining raster other than the first raster of the raster group into a dot row in parallel with the conversion of the first raster into a dot row, by determining the dot on-off state for each pixel in the remaining raster while taking into account the binarization errors that were diffused from the pixels that belong to the same raster group as the remaining raster and previously underwent dot on-off state determination, wherein the steps (C) and (E) are steps whereby the errors that are diffused into pixels belonging to the same raster group as the pixels as to which said dot on-off state determination has been conducted are stored separately from the errors that are diffused into pixels belonging to a different group.

21. A recording medium on which is recorded a computer-readable program that implements a method to convert image data into a specific expression format based on the dot on-off state by receiving image data representing tone values for each pixel and determining the dot on-off state for each pixel along a raster comprising a row of such pixels, said program causing a computer attain the functions of:

(A) generating a raster group by grouping multiple rasters arranged in an entire width direction of an image;

(B) selecting at least a last raster located at the end of said raster group and conducting dot on-off state determination for each pixel included in the selected raster, thereby converting the selected raster into a dot row indicating the dot on-off state;

(C) calculating the binarization error arising in each pixel included in the selected raster due to this dot on-off state determination and storing it in a first storage unit while associating it with each state-determined pixel;

(D) selecting the first raster located in the top position among the rasters in the raster group adjacent to the last raster and converting the first raster into a dot row by determining the dot on-off state for each such pixel while taking into consideration the binarization errors stored in connection with the dot state-determined pixels in the vicinity of each pixel comprising the first raster;

(E) storing the binarization error occurring in each pixel of the first raster in a second storage unit separately from the binarization error stored in the step (C) while associating it with each state-determined pixel; and (F) converting the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

22. A computer program product for converting image data into a specific expression format based on the dot on-off state by receiving image data indicating tone values for each pixel and determining the dot on-off state for each pixel along a raster which is a row of such pixels, said computer program product comprising:
a computer readable medium; and
a computer program stored on said computer readable medium, said computer program causing a computer to perform the functions of
(A) generating a raster group by grouping multiple rasters arranged in an entire width direction of an image;
(B) selecting the last raster at the end of the said raster group and determining the dot on-off state for each pixel included in this last raster, thereby converting the last raster into a dot row that indicates the dot on-off state;
(C) calculating the binarization error arising in each pixel due to this dot on-off state determination and diffusing it among multiple state-undetermined pixels in the vicinity of each such pixel;
(D) selecting the first raster located in the top position among the rasters in the raster group adjacent to the last raster, and converting the first raster into a dot row that indicates the dot on-off state by determining the dot on-off state for each pixel included in the first raster while taking into consideration the binarization errors diffused from the last raster among the pixels of said first raster;
(E) diffusing the binarization error occurring in each pixel included in the first raster among the state-undetermined pixels in the vicinity of each such pixel; and
(F) converting the remaining raster other than the first raster of the raster group into a dot row in parallel with the conversion of the first raster into a dot row, by determining the dot on-off state for each pixel in the remaining raster while taking into account the binarization errors that were diffused from the pixels that belong to the same raster group as the remaining raster and previously underwent dot on-off state determination, wherein the steps (C) and (E) are steps whereby the errors that are diffused into pixels belonging to the same raster group as the pixels as to which said dot on-off state determination has been conducted are stored separately from the errors that are diffused into pixels belonging to a different group.

23. A computer program product for converting image data into a specific expression format based on the dot on-off state by receiving image data indicating tone values for each pixel and determining the dot on-off state for each pixel along a raster which is a row of such pixels, said computer program product comprising:
a computer readable medium; and
a computer program stored on said computer readable medium, said computer program causing a computer to perform the functions of
(A) generating a raster group by grouping multiple rasters arranged in an
(B) selecting at least a last raster located at the end of said raster group and conducting dot on-off state determination for each pixel included in the selected raster, thereby converting the selected raster into a dot row indicating the dot on-off state;
(C) calculating the binarization error arising in each pixel included in the selected raster due to this dot on-off state determination and storing it in a first storage unit while associating it with each state-determined pixel;
(D) selecting the first raster located in the top position among the rasters in the raster group adjacent to the last raster and converting the first raster into a dot row by determining the dot on-off state for each such pixel while taking into consideration the binarization errors stored in connection with the dot state-determined pixels in the vicinity of each pixel comprising the first raster;
(B) storing the binarization error occurring in each pixel of the first raster in a second storage unit separately from the binarization error stored in the step (C) while associating it with each state-determined pixel; and
(F) converting the remaining raster other than the first raster of the raster group into a dot row in parallel with the conversion of the first raster into a dot row, by determining the dot on-off state for each pixel in the remaining raster while taking into account the binarization errors that occurred in the pixels that belong to the same raster group as the remaining raster and previously underwent dot on-off state determination.

* * * * *